US 8,165,146 B1

(12) United States Patent
Melick et al.

(10) Patent No.: US 8,165,146 B1
(45) Date of Patent: Apr. 24, 2012

(54) SYSTEM AND METHOD FOR STORING/CACHING, SEARCHING FOR, AND ACCESSING DATA

(75) Inventors: Bruce D. Melick, Cedar Rapids, IA (US); David M. Snyder, Cedar Rapids, IA (US); Leslie D. Baych, Cedar Rapids, IA (US); Gregory P. Probst, Iowa City, IA (US); Philip T. Kennedy, Cedar Rapids, IA (US)

(73) Assignee: Lightwaves Systems Inc., Cedar Rapids, IA (US)

( * ) Notice: Subject to any disclaimer, the term of this patent is extended or adjusted under 35 U.S.C. 154(b) by 1275 days.

(21) Appl. No.: 10/345,766

(22) Filed: Jan. 16, 2003

Related U.S. Application Data

(63) Continuation-in-part of application No. 09/698,793, filed on Oct. 27, 2000, now Pat. No. 6,868,419.

(60) Provisional application No. 60/366,803, filed on Mar. 22, 2002, provisional application No. 60/349,072, filed on Jan. 16, 2002, provisional application No. 60/162,094, filed on Oct. 28, 1999, provisional application No. 60/163,426, filed on Nov. 3, 1999, provisional application No. 60/220,749, filed on Jul. 26, 2000.

(51) Int. Cl.
*H04L 12/54* (2006.01)
*H04L 12/56* (2006.01)
*G06F 15/16* (2006.01)

(52) U.S. Cl. .................. 370/428; 370/390; 709/231

(58) Field of Classification Search .............. 370/363, 370/390, 312, 389, 428, 429
See application file for complete search history.

(56) References Cited

U.S. PATENT DOCUMENTS

| | | | | | |
|---|---|---|---|---|---|
| 4,236,245 | A | * | 11/1980 | Freeny et al. | 370/389 |
| 4,641,317 | A | * | 2/1987 | Fullerton | 375/130 |
| 4,689,627 | A | * | 8/1987 | Lee et al. | 342/373 |
| 4,979,186 | A | * | 12/1990 | Fullerton | 375/239 |
| 5,442,637 | A | * | 8/1995 | Nguyen | 714/708 |
| 5,758,085 | A | * | 5/1998 | Kouoheris et al. | 709/231 |
| 5,893,120 | A | * | 4/1999 | Nemes | 707/206 |
| 6,014,698 | A | * | 1/2000 | Griffiths | 709/224 |
| 6,148,414 | A | | 11/2000 | Brown et al. | |
| 6,507,562 | B1 | * | 1/2003 | Kadansky et al. | 370/216 |
| 6,597,663 | B1 | * | 7/2003 | Rekhter | 370/252 |
| 6,781,530 | B2 | | 8/2004 | Moore | |
| 6,782,048 | B2 | | 8/2004 | Santhoff | |
| 6,868,419 | B1 | * | 3/2005 | Melick et al. | 707/100 |
| 7,177,909 | B2 | * | 2/2007 | Stark et al. | 709/206 |
| 7,293,093 | B2 | * | 11/2007 | Leighton et al. | 709/226 |

(Continued)

OTHER PUBLICATIONS

Arthur D. Little, Data-Over-Cable Interface Specifications (Mar. 26, 1997), MCNS Holdings, L.P. All pages.*
www.cnn.com/2001/US/01/25/delaney.debrief/"Bill Delaney: Harvard Scientist Stops Light".

*Primary Examiner* — Hassan Phillips
*Assistant Examiner* — Hicham Foud
(74) *Attorney, Agent, or Firm* — McKee, Voorhees & Sease, P.L.C.

(57) ABSTRACT

A system for persistently maintaining data using a network for data packets is provided. The system includes a transmission medium associated with the network, a plurality of switches operatively connected to the transmission medium. Each switch has an intelligent network controller adapted for delivering the data packets to a device operatively connected to the intelligent network controller in response to a request for the data packets from the device and further adapted for re-transmitting unexpired data packets over the network.

30 Claims, 19 Drawing Sheets

U.S. PATENT DOCUMENTS

| | | |
|---|---|---|
| 2001/0014103 A1* | 8/2001 | Burns et al. .................. 370/429 |
| 2001/0026552 A1* | 10/2001 | Spratt et al. ................. 370/390 |
| 2001/0038628 A1 | 11/2001 | Ofek et al. |
| 2001/0049740 A1 | 12/2001 | Karpoff |
| 2001/0052016 A1* | 12/2001 | Skene et al. .................. 709/226 |
| 2002/0076193 A1 | 6/2002 | Melick |
| 2005/0240607 A1* | 10/2005 | Melick et al. ................. 707/100 |
| 2006/0168088 A1* | 7/2006 | Leighton et al. ............. 709/207 |

* cited by examiner

SYSTEM AND METHOD FOR STORING/CACHING, SEARCHING FOR, AND ACCESSING DATA

CROSS-REFERENCE TO RELATED APPLICATIONS

This application is a conversion of and claims priority to prior U.S. Provisional Patent Applications, Ser. No. 60/366,803 entitled SYSTEM AND METHOD FOR STORING/CACHING DATA ON TRANSMISSION INFRASTRUCTURE, Ser. No. 60/349,072 entitled METHOD AND SYSTEM FOR STORING DATA ON TRANSMISSION MEDIUMS, and U.S. patent application Ser. No. 09/698,793 entitled METHOD OF TRANSMITTING DATA INCLUDING A STRUCTURED LINEAR DATABASE, which claims priority to 60/162,094, 60/163,426, and 60/220,749, all of which are entitled STRUCTURED LINEAR DATABASES and are herein incorporated by reference.

BACKGROUND OF THE INVENTION

1. Field of the Invention

The present invention relates generally to storing/caching data directly on transmission mediums and network transmission hardware. More particularly, the present invention relates to systems and methods for searching, accessing, querying, and performing computations of locally or globally distributed data, stored/cached in the form of data packets, protocol data units (PDU), or protocol payloads, etc., continuously transmitted on a telecommunication network, and/or on a microprocessor, data bus, or electronic circuit for the life of the data packet(s) and/or data stream(s).

2. Problems in the Art

Each year it is estimated that between 1 and 2 billion gigabytes of unique information is created, and a high percentage of this information is created in a digital format. Of all that data, 90 percent is expected to be stored/cached digitally. Contributing to this is the rapid growth of digitized books, magazines, videos, music, and other 'rich content' and 'mass access' data. This growing volume of data is often located remotely, must be transported between computing devices, and stored/cached in a highly secure, accessible method. The exponential growth rate of generated data is expected to outpace improvements in communication bandwidth and storage/caching capacity in the near future. Consequently, this creates an urgent need to store/cache digital information in new ways that make it accessible at high speeds on a storage/caching medium and where the medium may be exponentially improved.

The access speed to digital information is ultimately controlled by the input/output (I/O) capacity of any electronic device. I/O is the lifeblood of computing, getting relevant information into and out of the processor, compute device, or appliance to the end-user on a timely basis. This has always been true, but never so much as in a networked computing environment.

Many associated I/O problems impede high speed access to remotely stored/cached data. Ethernet and TCP/IP are widely accepted, but inefficient protocols, which are used to drive LANs, WANs, and ultimately the Internet. The TCP/IP protocol suite has proven itself a basic foundation for communications of all kinds over essentially unreliable networks. But that fact alone makes it inefficient and creates network latency issues. TCP/IP-based protocols have a complex, layered design, with many inter-layer dependencies that can easily demand extensive processing and significant buffer memory to implement. Open Systems Interconnection (OSI) is a worldwide communications standard that defines a networking framework for implementing protocols in seven layers. Handling gigabit-class network traffic, servicing interrupts, moving data through long code-paths, and numerous kernel-to-application context switches are all expensive operations. Together, they yield long message latencies and use up a significant percentage of available processor power.

Another problem that impedes the high speed access to data is the venerable Peripheral Component Interconnect (PCI) shared data bus, which is one of the most prevalent I/O architecture for compute devices. For example, the bandwidth for board-level transfer, and processor to cache transfer on a typical PC is much higher than from the PC to a peripheral network device via PCI bus.

Data storage/caching centers have developed a variety of specialized networks, such as SANs (Storage Area Networks), specialized cluster links, NAS (Network Attached Storage), and RAID (Redundant Array of Independent Disks) systems in order to improve access to local and remotely distributed data. However, as RAID, NAS, Fast and Gigabit Ethernet, SANs, and SCSI (Small Computer System Interface) links are usually implemented with PCI adapter cards or PCI components, all of the data traffic on these network devices is ultimately throttled by the low-speed I/O devices.

I/O problems are further complicated by the architecture of a typical data storage/caching center. For example, a data storage/caching center for Web applications or Business-to-Business (B2B) exchanges may have hundreds of servers all requiring shared access to terabytes of file storage/caching. The workload is defined by server requests coming in through networked routers, switches, firewalls, load balancers, caching appliances, and the like. Since file sharing by multiple servers is a fundamental requirement of this environment, storage/caching is usually aggregated into shared storage/caching pools, accessed by the servers using a file access protocol such as Network File System (NFS). The result is a complex and sophisticated infrastructure that has exploded in importance in just the past few years.

Consequently, there are challenges surrounding how individual servers fulfill growing client requests and connections from 'the outside world', and how these challenges impact organization of complex and discrete files, data, databases, and storage. PCI-X and Infiniband are two solutions that will greatly improve I/O performance, and therefore increase broadband access to remotely stored/cached digital information.

Infiniband is an architecture and specification for data flow between processors and I/O devices that promises greater bandwidth and almost unlimited expandability in tomorrow's computer systems. In the next few years, Infiniband is expected to gradually replace the existing Peripheral Component Interconnect (PCI) shared-bus approach used in most of today's personal computers and servers. Offering throughput of up to 2.5 gigabytes per second and support for up to 64,000 addressable devices, this architecture also promises increased reliability, better sharing of data between clustered processors, and built-in security. Infiniband is the result of merging two competing designs, Future I/O, developed by Compaq, IBM, and Hewlett-Packard, with Next Generation I/O, developed by Intel, Microsoft, and Sun Microsystems. For a short time before the group came up with a new name, Infiniband was called System I/O.

PCI-X (Peripheral Component Interconnect Extended) is a new computer bus technology (the "data pipes" between parts of a computer) that increases the speed data can move within a computer from 66 MHz to 133 MHz. This technology was developed jointly by IBM, HP, and Compaq, and PCI-X doubles the speed and amount of data exchanged between the computer processor and peripherals. With the current PCI design, one 64-bit bus runs at 66 MHz and additional buses move 32 bits at 66 MHz or 64 bits at 33 MHz. The maximum amount of data exchanged between the processor and peripherals using the current PCI design are 532 MB per second. With PCI-X, one 64-bit bus runs at 133 MHz with the rest running at 66 MHz, allowing for a data exchange of 1.06 GB per second. PCI-X is backwards-compatible, meaning that you can, for example, install a PCI-X card in a standard PCI slot but expect a decrease in speed to 33 MHz. You can also use both PCI and PCI-X cards on the same bus, but the bus speed will run at the speed of the slowest card. PCI-X is more fault tolerant than PCI. For example, PCI-X is able to reinitialize a faulty card or take it offline before computer failure occurs.

PCI-X was designed for servers to increase performance for high bandwidth devices such as Gigabit Ethernet cards, Fibre Channel, Ultra3 Small Computer System Interface, and processors that are interconnected as a cluster. Compaq, IBM, and HP submitted PCI-X to the PCI Special Interest Group (Special Interest Group of the Association for Computing Machinery) in 1998. PCI SIG approved PCI-X, and it is now an open standard that can be adapted and used by all computer developers. PCI SIG controls technical support, training and compliance testing for PCI-X. IBM, Intel, Microelectronics and Mylex plan to develop chipsets to support PCI-X. 3Com and Adaptec intend to develop PCI-X peripherals.

To accelerate PCI-X adoption by the industry, Compaq offers PCI-X development tools at their Web site.

When remotely storing digital information the following criteria should be considered: the frequency of read access, frequency of write access, size of each access request, permissible latency, permissible availability, desired reliability, security, etc. Some data is accessed frequently, yet rarely changed. Other data is frequently changed and requires low latency access. These factors should be taken into account, but are often compromised in the "one size fits all" design and operation of conventional data storage/caching systems.

Preferably, a data storage/caching system should be designed to be scaleable so a user can purchase only the capacity needed at any particular time. High reliability and high availability are also considerations as data users want remote access to data, and have become increasingly intolerant of lost, damaged, and unavailable data. Unfortunately, current conventional data storage/caching architectures compromise these factors, and no single data storage/caching architecture provides a cost-effective, highly reliable, highly available, and dynamically scaleable solution.

Today the end-user can have high-speed access to streaming and non-streaming data in the form of websites, electronic text documents, graphic images, or spreadsheets stored/cached remotely by purchasing telecommunication bandwidth in the form of a T-1 or a fractional T-3 line, a Digital Subscriber Line (DSL), or through their cable TV provider using a cable modem. However, no conventional digital information storage/caching system addresses the needs of the end-users desire for widespread, low latency access to streaming and non-streaming multi-media data in the form of music, TV shows, movies, radio broadcasts, web casts, etc.

Advances in fiber optic transmission technology and its declining cost have enabled upgrades in front-end network systems such as cable TV network trunk and feeder systems. Traditionally, these systems have increased the bandwidth of a telecommunication network sufficiently to provide each subscriber his own dedicated channel to the head-end for receiving compressed digital video. In addition, direct broadcast satellite technology and other emerging wireless communication technologies also provide dedicated multimedia and video channels between a large number of end-users and the server systems. Personal computers and set top boxes for the end-user are also emerging, which enable networked multimedia applications.

The above mentioned improvements may typically improve the overall performance of current video server systems by a factor of only two or four times, whereas the current need in the industry requires improvements in the range of 100 to 1000 times to make interactive streaming video services economically feasible.

While the end-user (client) system and the front-end network system infrastructure is evolving rapidly to meet the requirement of non-streaming and interactive multimedia services, the constraints of current server architectures continue to be expensive and impractical for delivering these services. Current server systems are unable to process the large number of data streams that are required by streaming multimedia and video services. The current choices of servers are typically off-the-shelf mainframe or workstation technology based parallel computing systems. The hardware and software in both cases is optimized for computation intensive applications and for supporting multiple concurrent users (time-sharing) with very limited emphasis on moving data to and from a telecommunication network interface and the Input/Output (I/O) device.

Another key to acceptable multimedia audio and video streaming is the concept of Quality of Service (QoS). Quality of Service generally refers to a technique for managing computer system resources, such as bandwidth, by specifying user visible parameters such as message delivery time. Policy rules are used to describe the operation of data packet(s) to make these guarantees. Relevant standards for QoS in the IETF (Internet Engineering Task Force) are the RSVP (Resource Reservation Protocol) and COPS (Common Open Policy Service) protocols. RSVP allows for the reservation of bandwidth in advance, while COPS allows routers and switches to obtain policy rules from a server.

A major requirement in providing Quality of Service is the ability to deliver multi-media frame data at a guaranteed uniform rate. Failure to maintain Quality of Service may typically result in an image that is jerky or distorted.

Traditional server system architectures have not been equipped with the functionality necessary for providing Quality of Service on a large scale. With an increasing load on server systems to provide streaming multimedia applications, an increased volume of user (end-clients), and the above mentioned deficiencies in current server system technology, a need exists to provide a server system architecture or a new data storage/caching system with enhanced search and access capabilities which will be able to address the need of low latency, high-speed access to data.

U.S. Pat. No. 5,758,085 assigned to the International Business Machine (IBM) Corporation partially addresses the above-named problems by providing a plurality of intelligent switches in a Storage Area Network (SAN). When the end-user (client) makes a request to receive video and multimedia data, a request is sent to the host processor which in turn sends a request to a plurality of intelligent switches on the SAN. The intelligent switches include a cache for storing the requested data. The data is relayed directly from these switches to the end-user (client) requesting the multimedia data.

While the IBM system described above provides for the storage/caching of data onto switches, it does not allow the individual switches to cooperate together as a distributed architecture in order to pool bandwidth together to supply the backbone network, nor does it allow for the data to reside directly on a telecommunication network medium. Current technology allows for only a 1-2 gigabyte data stream coming out of a single peripheral device such as an array of disks, wherein a telecommunication network backbone may accommodate a 10 gigabyte or higher data stream. Also, in the above referenced patent, the individual switches are not capable of working together to distribute a delivery request over multiple switches for load balancing and streaming of the requested data.

United States Patent Application 20010049740, filed by Karpoff, addresses many of the shortcomings of the previously referenced IBM U.S. Pat. No. 5,758,085, by describing various systems and methods for delivering streaming data packets to a client device, over a telecommunication network in response to a request for the data packets from the client device. The client request is received by a server or a controller device that is typically located on a network switch device. If received by a server, the server sends a request to the intelligent network controller device for the transfer of the requested data to the client.

In addition to the data storage network architecture and bus problems discussed above, rapid access to and intelligent searching of data is impeded by the requirements of traditional relational database structures.

It has been 16 months since terrorists attacked the United States, and federal agencies are struggling to find a way to best share information to prevent future acts of terrorism. The key to fighting terrorism is the real-time free flow of information between federal agencies as well as with state and local governments. More than ever before, successful interdiction is dependent upon collecting, analyzing, and appropriately sharing information that exists in different databases, transactions, and other data points. The effective use of accurate information from diverse sources is critical to the success in the fight against terrorism. There is no lack of desire to share information in a cooperative way, however, there is no easy, and inexpensive solution to accomplish the sharing of data stored in traditional database structures.

Recently, the FBI has chosen to pursue "investigative data warehousing" as a key technology for use in the war against terrorism. This technology uses data mining and analytical software to sift through vast amounts of digital information to discover patterns and relationships that point to potential criminal activity. The same technology is also widely used in the commercial sector to track consumer activity and predict consumer behavior.

The FBI plans to build a data warehouse that receives information from multiple FBI databases and sources. Eventually, this warehouse might receive and send warehoused data to and from other law enforcement and intelligence agencies. In the war against terrorism new information technology is critical to analyzing and sharing information on a real-time basis. Also, the FBI is working to focus on analytical capabilities far more than it has in the past. For example, the FBI might want to put in a request for information on flight schools and access all the reports the FBI has written on flight schools from various FBI databases and then analyze them using artificial intelligence software, however, they are far from having this capability, which is known as enterprise data warehousing in the business world.

Data warehousing and data analysis/modeling tools are used extensively in the commercial sector to monitor sales in stores and automatically order new stock when inventories run low, monitor individual customer buying habits and try to influence consumer buying. The FBI is considering applying the same analysis techniques/tools currently used by the private sector to search vast collections of data to identify suspicious trends. For example, analyzing data collected in various FBI databases and by the Immigration and Naturalization Service, the CIA and other agencies could indicate suspicious activity that now is overlooked. Add to that data from credit card companies, airlines, banks, phone companies and other commercial entities, and actions and events that previously seemed innocent when considered separately, begin, to trigger alarms when considered in context with other activities.

Most business executives make critical decisions based on data that's been cut and sliced for them by information managers. If executives could get closer to their core business data, they would increase their odds of making better-informed decisions. The promise of business-intelligence software is to make existing enterprise databases accessible through easy-to-use analytical and reporting functions. Business-intelligence software quickly and cheaply allows organizations to extract additional value from existing data warehouses and enterprise systems.

Business-intelligence software is nearly useless for companies that have "dirty data." Before any quality feedback can be produced, databases must have consistent categories, language, and maintenance. Unfortunately, for most organizations due to mergers and acquisitions, the tendency is toward chaos. They end up trying to use incompatible databases to force new data into legacy information systems. Consequently, uniform data-entry protocols are lacking, or ignored, making it difficult to implement changes. For example, a data field such as, a supplier's name can be entered any number of ways by employees. Cleanup of such dirty data can be costly and can take from a few months to a few years.

Although the government has a huge effort underway for implementing data mining, business intelligence, and on-line analytical processing (OLAP) of transactions stored in traditional, structured data sources, intelligence agencies are in need of unstructured textual analysis to find patterns in unstructured data.

One company, Maya Viz, combines various elements of collaboration, knowledge management, and business intelligence to bring data into a visual form that can be manipulated and shared. This technology was first deployed in military command situations. The company's component architecture aims to transform relational database information pieces into nuggets, visualize them, and then through peer-to-peer connections, allow people to share the information with anyone.

Tacit Knowledge System's software automatically discovers expertise and activity across large organizations, and connects people and information. This software taps into existing content sources such as document repositories and e-mail archives to discover individual expertise and activity, and then makes end-users aware of relevant colleagues and data.

The U.S. has approximately 170,000 people working together to prevent attacks on the United States. This is an incredibly complex process, using multiple information technology systems to record information about case research, various memos, etc. In addition, a system that could tap into all those multiple information repositories and figure out who is working on what, would be phenomenally valuable to make critical connections between different agencies, departments, and analysts.

However, current data mining, warehousing, and business intelligence technologies are expensive and become difficult to implement, particularly when multiple federal, state, and local agencies become involved, all of which use their own proprietary technologies and data formats. The constraint of these current data technologies is the requirement for predetermining storage format, for example, table structure and upfront analysis.

There is therefore a need for a method of storing/caching, searching, accessing, querying, and performing computations on data in the form of data packet(s) and/or data streams continuously transmitted for the life of the data on a telecommunication network, and/or a microprocessor, data bus, or electronic circuit. The resulting solution needs to be cost effective, avoid traditional I/O problems, overcome the limitations of traditional relational database structures, and avoid other problems.

FEATURES OF THE INVENTION

A general object, feature, or advantage of the present invention is the provision of a method for storing/caching data, which overcomes the problems found in the prior art.

A further object, feature, or advantage of the present invention is the provision of a method to store/cache data packet(s) by allowing them to be continuously transmitted on a telecommunications network, and/or a microprocessor, data bus, or electronic circuit for the life of the data packet(s).

A further object, feature, or advantage of the present invention is the provision of a method to store/cache data stream(s) by allowing them to be continuously transmitted on a telecommunications network, and/or a microprocessor, data bus, or electronic circuit for the life of the data stream(s).

A further object, feature, or advantage of the present invention is the provision of a method for data storage/caching that is highly scalable through additional access points.

A further object, feature, or advantage of the present invention is the provision of a method for data storage/caching that is highly scalable through additional parallel connections.

A further object, feature, or advantage of the present invention is the provision of a method for data that can be easily erased without leaving a trace.

A further object, feature, or advantage of the present invention is the provision of a method for data storage/caching that is redundant and fault tolerant.

A further object, feature, or advantage of the present invention is the provision of a method for data storage/caching system that interfaces with public protocols and standards.

A further object, feature, or advantage of the present invention is the provision of a method for data storage/caching system that interfaces with proprietary protocols and standards.

A further object, feature, or advantage of the present invention is the provision of a method to access data stored/cached in the form of continuously transmitted data packet(s) and/or data stream(s).

A further object, feature, or advantage of the present invention is the provision of a method to search for data stored/cached in the form of continuously transmitted data packet(s) and/or data stream(s).

A further object, feature, or advantage of the present invention is the provision of a method to query data stored/cached in the form of continuously transmitted data packet(s) and/or data stream(s).

A further object, feature, or advantage of the present invention is the provision of a method to use data stored/cached in the form of continuously transmitted data packet(s) and/or data stream(s) as a chaotic database.

A further object, feature, or advantage of the present invention is the provision of a method to use data stored/cached in the form of continuously transmitted data packet(s) and/or data stream(s) as a structured linear database.

A further object, feature, or advantage of the present invention is the provision of a method for performing computations on data stored/cached in the form of continuously transmitted data packet(s) and/or data stream(s).

One or more of these and/or other objects, features, or advantages of the present invention will be apparent based on the Specification and claims that follow.

SUMMARY OF THE INVENTION

According to one aspect of the present invention, the present invention provides for storing data by persistently maintaining the data on a network, through retransmission. The data can be associated with expiration properties. The expiration properties can include geographical information and/or time attributes. The data can be in packets or streams.

Referring to previously filed U.S. Provisional Patent No. 60/349,072 to Melick, et al, "FiberSan" was used as a name for one aspect of the present invention, and it is sometimes referred to as "DataSpace" throughout this disclosure, and is also referred to as a storage/caching system or a network when appropriate. The term "network data packet" will now be referred to as "data packet". The present invention relates generally to storing/caching, searching, accessing, querying, and performing computations of data persistently maintained through retransmission, directly on the telecommunication network, and/or a microprocessor, data bus, or electronic circuit. More particularly, the present invention relates to systems and methods for accessing, searching, querying, and performing computations on locally or globally distributed data which are stored/cached in the form of data packets, protocol data units (PDUs), or protocol payloads, etc., continuously transmitted on a telecommunication network, and/or on a microprocessor, data bus, or electronic circuit for the life of the data packet(s).

As used herein, and unless otherwise specified, the term "data" is to be construed broadly to refer to a data packet, protocol data unit, protocol payload, data stream or other form of data.

As used herein, and unless otherwise specified, the term "network" is to be construed broadly to refer to a network, a telecommunication network, or other type of network. It is to be understood that data present on a microprocessor, data bus, or electronic circuit associated with the network is still present on the network, and the microprocessor, data bus, or electronic circuit of the device can be considered part of the network in this context.

As used herein, the term "storing" is to include "caching" and querying is to include "searching". These and other terms that may have different uses or particular connotation in particular contexts are to be construed broadly in defining the present invention.

Data content and applications have historically resided at the core of the Internet. However, in an effort to improve the performance of content delivery, distributed computing has evolved. Distributed computing is the process of moving content and applications closer the end user, in what is referred to as the "edge". To support this transition, enterprises are creating their information technology systems on top of the Internet Protocol (IP), which elevates the need for distribution and computing closer to the "edge".

The present invention allows data packets to "reverberate" on a telecommunication network, and/or microprocessor, data bus, or electronic circuit, remaining unresolved for delivery, on-demand for the life of the data packet(s) and/or data stream(s). The present invention overcomes limitations associated with existing data storage/caching, accessing and searching technologies. The present invention creates unique new revenue opportunities for carriers to better utilize their telecommunication network assets.

In the preferred embodiment, the present invention provides a number of advantages over traditional remote data storage/caching, accessing, search, querying, and computational methods. These advantages can include: (1) reducing overall latency to and from remote data source(s); (2) providing direct access to data; (3) providing parallel multicasting capabilities; (4) improving multicasting efficiency in telecommunication networks; (5) reducing latency by moving the data storage/caching and data storage/caching logic to a telecommunication network, and/or microprocessor, data bus, or electronic circuit which allows the synchronized communication between individual intelligent network controller devices; (6) eliminating the requirement for server or disk access by moving data storage/caching directly onto the telecommunication network, and/or microprocessor, data bus, or electronic circuit; (7) improving Quality of Service for streaming and non-streaming data as a result of reduced latency and increased bandwidth; (8) increasing the overall throughput and/or reliability by implementing RAID methods on the intelligent network controller device(s), for example utilizing RAID to mirror the data across two or more separate DataSpaces; (9) reducing the time required for data backups, data replication and distribution by moving the administrative functions of data storage/caching onto the intelligent network controller device; and (10) increasing availability by caching multiple copies of the same data, which is particularly useful for multi-media.

In the preferred embodiment, the present invention can (1) lower the cost to store/cache data; (2) lower overall latency and improving access speeds; (3) provide new functionality that enables a host of new applications/services to service providers and their customers; (4) provide a "geographic tag" to improve data cache selection and data routing; and (5) provide new data search and query capabilities.

The present invention provides systems and methods for storing/caching, accessing, querying, searching, and performing computations of data on telecommunication network infrastructure, which includes mediums, such as but not limited to, fiber optic cable, Category 5 wire, coaxial cable, airwaves, ground waves, vacuum, space, etc., which have been partitioned by the present invention's switches, which also may serve as nodes on a telecommunication network. The present invention's switches are enabled with intelligent network controller devices which are capable of copying and/or forwarding data (streaming or non-streaming) stored/cached in the form of data packets, PDUs, or protocol payloads, to a client device over a telecommunication network, and/or microprocessor, data bus, or electronic circuit, in response to a request for data from a client device. The client device's request for data is received by a server, or directly by the intelligent network controller device. Alternatively, the server may send a request to an intelligent network controller device to control the forwarding of the requested data packet(s) stored/cached to the client.

The switches and/or intelligent network controller devices of the present invention are not restricted in location and can be accessed remotely by the client. They can be co-located on the same physical device as the client and attached via a network, data bus, or electronic circuit. As an example, a switch and intelligent network controller device may be co-located on a card or device interconnected by PCI or USB bus on the same computer.

In a preferred embodiment, the present invention delivers data stored/cached on a telecommunication network infrastructure to a client device making a request for data over a public and/or private telecommunication network, such as but not limited to, a Wide Area Network (WAN), a Metropolitan Area Network (MAN), a Local Area Network (LAN), a Wireless Wide Area Network (WWAN), a Wireless Local Area Network (WLAN), a Personal Area Network (PAN), or a Broadcast Area Network (BAN), or any combination, or sub-combination of these, or other telecommunication networks, and/or microprocessor, data bus, or electronic circuit.

Alternatively, in a preferred embodiment, the client device's request for data may also be received directly by an intelligent network controller device. The present invention's intelligent network controller device includes the processing capability required for identifying, copying or transferring the data, and delivering it directly to the client device without involving a server system. The data request may be mirrored to another controller device to handle the data processing and delivery functions. In other cases, the controller device may coordinate the delivery of the requested data using one or more other similar controller devices, in parallel.

In another embodiment of the present invention, data requests for large amounts of data are handled by the present invention's intelligent network controller devices working in parallel synchronization, to deliver data packets stored/cached on various channels of a storage system, or on various disparate storage systems.

In another embodiment of the present invention, a storage system of the present invention may be expanded beyond the geographical bounds imposed by the present invention's switches, which are used to partition a telecommunication network, and/or microprocessor, data bus, or electronic circuit, to include a client device as one of the nodes in the network. In this way, a client device can efficiently and continually broadcast updated data packets.

In another embodiment of the present invention, a the present invention may be used as data storage/cache on a microprocessor, or data bus, or electronic circuit.

These embodiments of the present invention represent various architectures on which data may be stored/cached in the form of data packets, PDUs, or protocol payloads, etc., continuously transmitted on a telecommunications network, and/or a microprocessor, data bus, or electronic circuit for the life of the data packet.

Some of the unique applications for the present invention include, but are not limited to, a chaotic database, a DNS server update mechanism, a storage/cache system for data, file systems, and meta-data, mobile data systems, high read use/decision support systems, content management and geographical routing, and as a support technology for stream querying and grid computing.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements. Additionally, the left-most digit(s) of a reference number identifies the drawing in which the reference number first appears.

BRIEF DESCRIPTION OF THE DRAWINGS

FIG. 9 shows screenshots of output from the DataSpace hardware and software used in a first prototype of the present invention.

FIG. 11 shows screenshots of output from the DataSpace hardware and software used in a first prototype of the present invention.

DETAILED DESCRIPTION OF THE PREFERRED EMBODIMENT(S)

Figure 1:
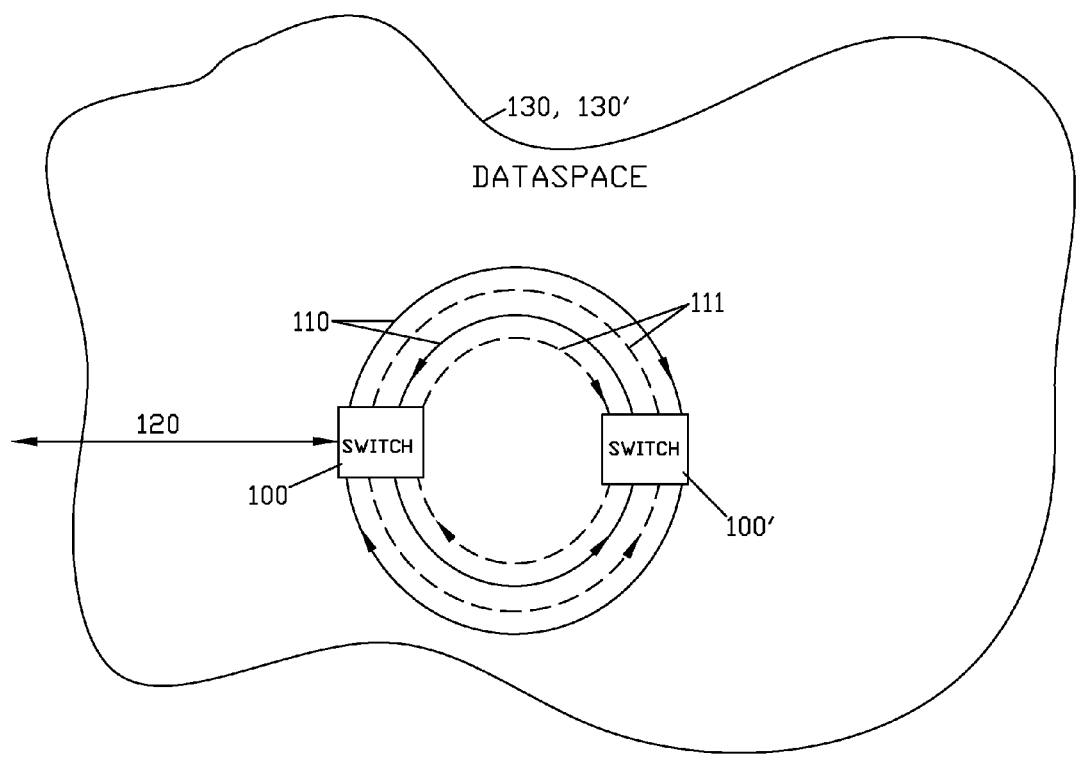
FIG. 1 illustrates the components of present invention's storage/caching system.

The present invention generally relates to storage/caching systems (DataSpace). In particular, the present invention relates to methods and systems for storing/caching, accessing, searching, querying, and performing computations on locally or globally distributed data stored/cached in the form of data packets, PDUs, or protocol payloads, etc., continuously transmitted on a telecommunication network, and/or a microprocessor, data bus, or electronic circuit. In a DataSpace, the term data storage/caching does not imply a static physical storage/caching device, but is defined as data in the form of data packets, PDUs, or protocol payloads, etc., continuously transmitted on telecommunication network, and/or microprocessor, data bus, or electronic circuit for the life of the data packet(s).

DataSpace complements two existing computing concepts, stream querying and grid computing. DataSpace provides a new data storage/cache technology that increases the speed and methods of data access, searching, querying, and computing capabilities. A DataSpace differs from stream querying in that it adds a level of persistence to data streams by continuously transmitting them on the telecommunications network, and/or a microprocessor, data bus, or electronic circuit.

The following table illustrates a comparison of key metrics between a typical disk storage medium (Seagate Cheetah disc drives) and a 244 mile long DataSpace.

TABLE 1

|  | DATASPACE | DISK DRIVE |
| --- | --- | --- |
| TRANSFER RATE | 1 Gpbs (Gigabit Ethernet) | 427 Mbps |
| SEEK TIME | .382 msec | 5.2 msec |
| LATENCY | 2.99 msec (244 mile network) | 2.99 msec |

DataSpace also facilitates access within the grid computing environment by providing an alternative method for the distribution, storage and caching of data to remote or grid interconnected computing resources and services. In addition, DataSpace can aid in the grid computing support and management systems by storing "directory of services", meta-services, resource and service access and availability information.

The STREAM project at Stanford University is supported in part by the National Science Foundation under grant IIS-0118173. This research project addresses applications such as network monitoring, telecommunications data management, web personalization, manufacturing, sensor networks, and others, in which data takes the form of continuous data streams rather than finite stored data sets. Traditional database systems and data processing algorithms are ill-equipped to handle data streams effectively, and many aspects of data management and processing need to be re-examined in the presence of data streams.

The STREAM project is investigating data management and processing in the presence of multiple, continuous, rapid, time-varying data streams. Their work addresses problems including basic theory results, algorithms, and implementing a comprehensive prototype data stream management system. The STREAM project, and other data stream technologies are relevant to the present invention, as DataSpace is in fact a persistent data stream which is continuous, although more repetitious in nature, rapidly varying, and can be created from a compilation of multiple source streams. Therefore, the results and findings of the STREAM project and related work will be fundamentally useful in creating a streaming data manager for the present invention.

The data packets, PDUs, and/or protocol payloads used by the present invention can be defined by any non-proprietary or proprietary protocols. Examples of non-proprietary protocols for defining data packets include but are not limited to, Asynchronous Transfer Mode (ATM) frames, Internet Protocol (IP) packets, or Cellular Digital Packet Data (CPCD) packets (commonly known as IP over wireless). Two proprietary protocols for defining data packets are Novell's IPX/SPX protocol and Apple Computer's AppleTalk protocol. Closed network systems used by financial institutions, government, or the military might use a proprietary data packet protocol internally, particularly where security is an issue. A unique proprietary data packet protocol, in which a data packet's payload is defined and structured as a linear database, is disclosed in the previously mentioned U.S. patent application Ser. No. 09/698,793. Another proprietary data packet protocol, Lightwaves Data Link (LDL), was designed for use with the system described in U.S. Provisional Patent application 60/376,592, to Melick, et al, entitled High Number Base Encoded Ultra Wideband Over Guided Lines And Non-Guided Narrow Band Radio, incorporated herein by reference. This proprietary protocol is based on Simple Data Link (SDL), which is a variable length ATM protocol.

Referring to FIG. 1, the general topology of a DataSpace 130, 130' used in the preferred embodiment and several of the alternative network embodiments of the present invention is shown. A DataSpace 130, 130' is comprised of three basic components: (1) switches 100, 100' are equipped with a intelligent network controller device 200 as defined in FIG. 2, (2) 'working telecommunication medium' 110 and 'spare telecommunication medium' 111 to couple DataSpace switches 100, 100', and (3) a data link 120 to connect the DataSpace 130, 130' to a telecommunication network.

Figure 4:
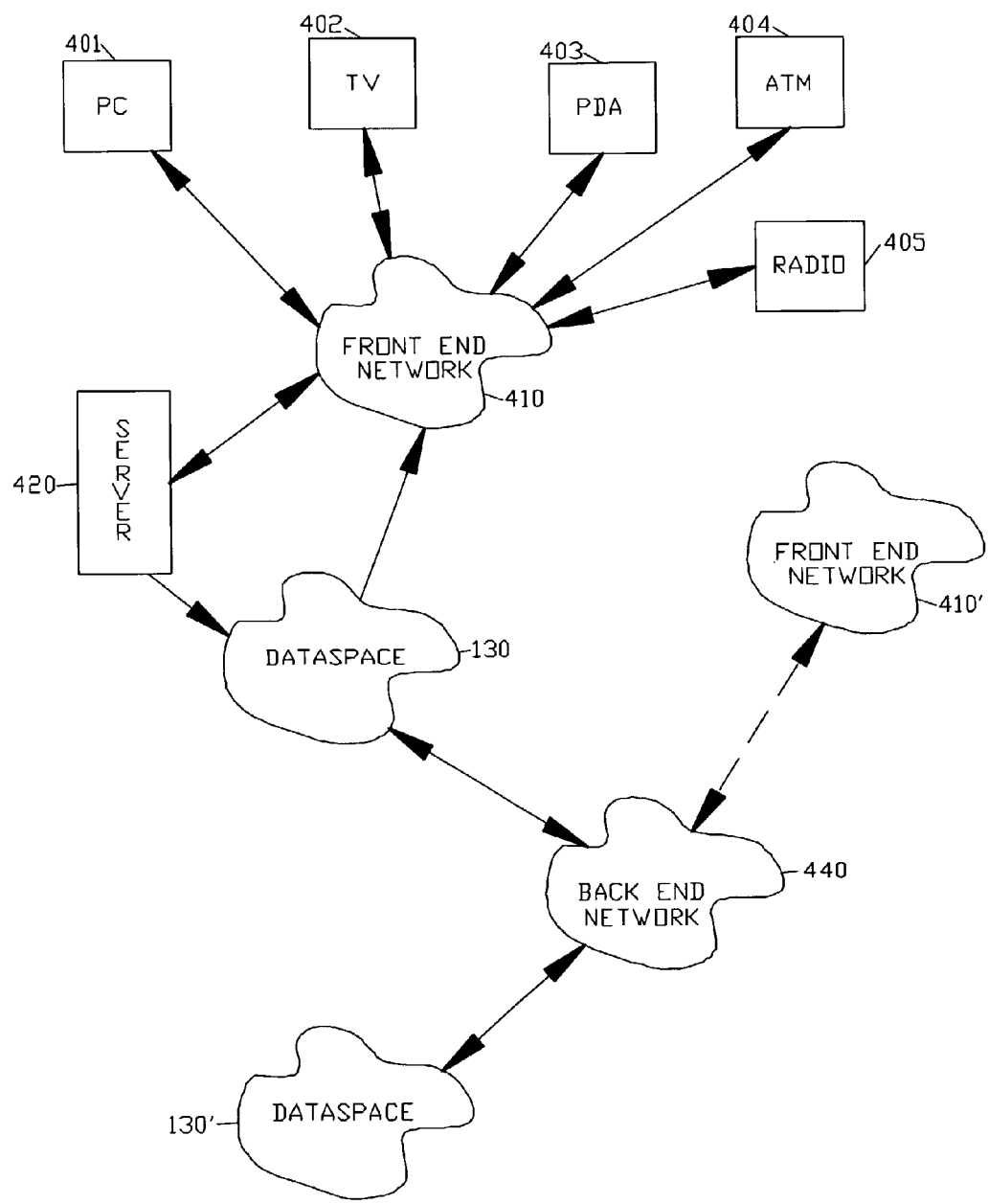
FIG. 4 illustrates the preferred embodiment of the present invention, in which a request message is routed through a server, which communicates with an intelligent network controller device located on a DataSpace through a back end network to another DataSpace.
Figure 5:
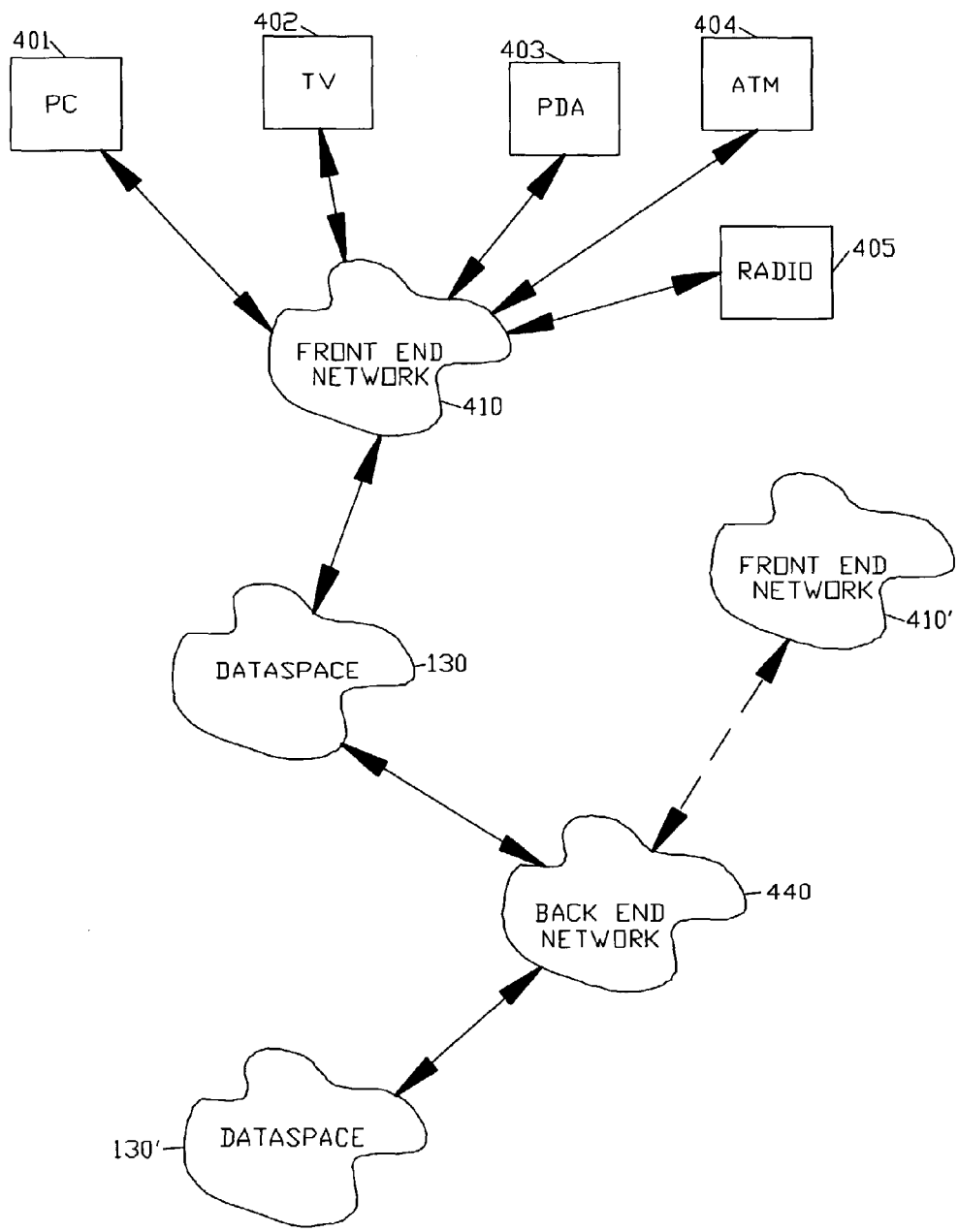
FIG. 5 illustrates another embodiment of the present invention, in which a request message is sent directly to an intelligent network controller device on a DataSpace, which communicates with another intelligent network controller device located on another DataSpace through a back end network.
Figure 6:
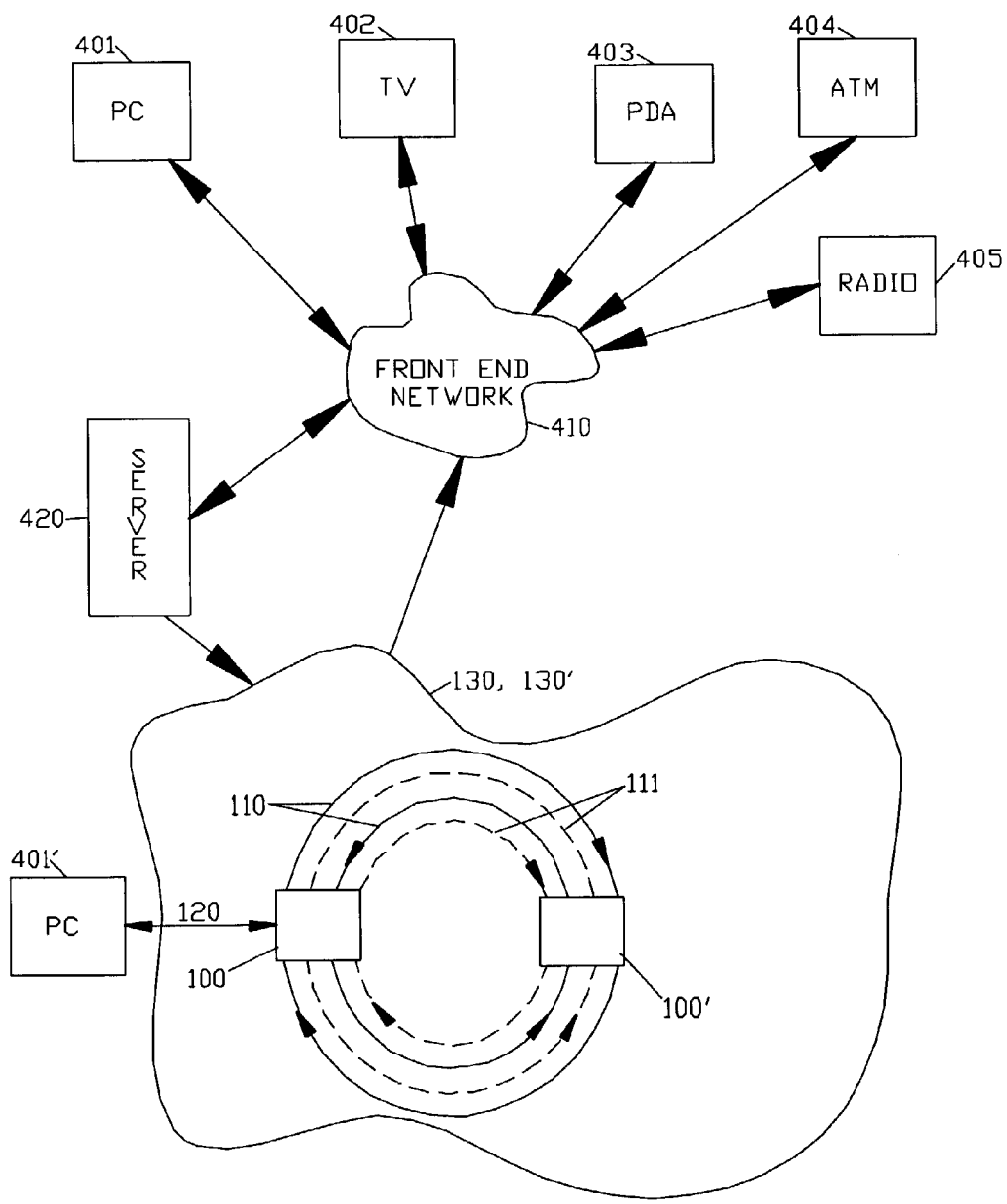
FIG. 6 illustrates another embodiment of the present invention, in which a client device becomes one of the nodes in the DataSpace.

The switches 100, 100' can be configured in many different form factors, such as but not limited to carrier class soft switches, data network elements such as switches, routers, hubs, and bridges, programmable hardware with architecture similar to a Lucent Excel LNX programmable switch, host controllers, etc. The functions of the switch 100, 100' may be reduced to a microprocessor, such as but not limited to, an Application Specific Integrated Circuit (ASIC), or Field Programmable Gate Array (FPGA) for deployment in a client device, such as, but not limited to, a personal computer 401, cable TV set-top box 402, PDA 403, ATM 404, radio 405, as shown in FIG. 4, FIG. 5, and FIG. 6, which enables the client device, a personal computer 401, cable TV set-top box 402, PDA 403, ATM 404, radio 405, to be used as one of the nodes in a DataSpace 130, 130'.

The DataSpace switches 100, 100' can also be configured to operate as a new class of telecommunication switches based on an emerging technology known as XML switching. XML switching deployed on switches 100, 100' may use XML as a universal translator, which can automatically adapt to and transform to a myriad of XML schemas, protocols, and standards which have been, and are being developed for a variety of industries and applications. XML switching intelligence on a telecommunication network will enable a freer and faster flow of information from the DataSpace 130 to other DataSpaces 130', as shown in FIG. 4, FIG. 5, and FIG. 6 systems, applications, and end-users.

Sarvega, Inc. manufactures Extensible Mark-up Language (XML) switches powered by their XML Event Stream Operating System™ (XESOS™) technology to allow the intelligent routing of XML-based data at wire speeds.

The explosive growth of XML usage in corporate IT infrastructures has made it necessary to address the performance issues inherent in XML processing. XML processing tasks, such as XSL transformation, schema validation, XPATH-based classification, XML security, and intelligent routing are all inherently processing intensive. This has placed a significant burden on existing server infrastructure that is not optimized to perform these tasks. Sarvega's switches have been designed to provide the specialized processing and intelligence required to transparently offload XML processing from the general purpose server infrastructure.

Sarvega's XML switches could be modified to allow DataSpace switch logic to reside directly on their switch in order to give them the advantages associated with continuously transmitted data packet(s) or data streams containing information within XML constructs. This combination of Sarvega's mature XML processing integrated with the present invention's switching and processing logic would be one method of enabling applications such as a chaotic database.

Alternatively, Sarvega's XML switches could be incorporated as a stand-alone component(s) in a DataSpace controlled by present invention's switching hardware and logic.

The present invention can incorporate XML switching technology to store and tag geographic information for data packets, and be used for subsequent routing on a DataSpace 130, 130'. Assigning and storing a DataSpace packet's information can be a self-provisioning feature, particularly for mobile devices that employ radio frequency positioning technology such as the NAVSTAR Global Positioning System (GPS), Loran, Shoran, or the emerging technology for precise local positioning known as ultra wideband (UWB). Another self-provisioned method, which is unique to the present invention uses geographic information related to an end-user, or hardware device, particularly for stationary devices such as desktop personal computers, Automatic Teller Machines (ATM), fax machines, etc. This end-user information can be acquired for use on the DataSpace through the use of an onboard software utility which maps manually input information such as zip code, address, or telephone number to a latitude and longitude.

In addition to the above mentioned self-provisioning methods for obtaining and incorporating geographic information for use in intelligent data packet routing, there are many other public and private sources for obtaining and provisioning geographic information as described in U.S. Provisional Patent Application Ser. No. 60/732,505 to Melick, et al., entitled UNWED MESSAGE SYSTEM, incorporated herein by reference. The United States Postal Service databases and systems map longitude and latitude to street address and zip code. Corporate entitles, such as telephone companies, maintain cross-reference databases for telephone number to latitude and longitude information, Also, fee-based service providers, such as Quova, map IP addresses to latitude and longitude.

Geographical information obtained from of the above mentioned means can be used to augment the intelligent routing capabilities of DataSpace switches 100, 100' in order to cache data, particularly data that is geographically/demographically sensitive, closer to an end-user.

The geographical information and/or time information can be used in associating expiration properties with the data. Based on expiration or related binding properties, access to data can be limited. For example, data can be accessible only during pre-defined time frames. Geographical and time information can be combined to create more complex binding properties.

A DataSpace 130, 130' uses a telecommunication network infrastructure to store/cache data in the form of data packets, PDUs, or protocol payloads, etc., continuously transmitted on the network for the life of the data packet(s) or data stream(s). The time of transit between DataSpace switches 100, 100' will be relatively short in comparison to the time stored in the Random Access Memory (RAM) on these switches. The RAM will contain a processing buffer for sending a data packet and subsequent receiving and re-sending of the same data packet. This buffer may also be provided by intelligently routing data packets over a minimum length of network transmission medium to buffer the time required to process a data packet. On a network the length of transmission medium can be reduced by intelligently routing data packets over multiple channels to buffer the time between the sending and receiving of the same data packet. Alternatively, an air gap between terrestrial satellite ground stations and orbiting satellites may be used to create a buffer between the sending and receiving of the same data packet. A buffering device on a DataSpace 130, 130' that uses fiber optic medium could be created in the future by intentionally slowing light down, or even stopping it completely by directing it into super-cooled, sodium atoms as described in a Jan. 25, 2001 article by Bill Delaney, posted on the CNN.com web-site (C:\WINDOWS\Temporary Internet Files\OLK40D4\CNN.com-US-Bill Delaney Harvard scientist stops light-January 25, 2001.html).

For matters of practicality and creating easy migration paths to the widespread use of DataSpaces 130, 130' in the marketplace, the DataSpace switches 100, 100' are designed to receive data packets for storage/caching over data link 120, using any standard messaging protocol. Typical examples of messaging protocols used in accordance with the present invention for sending messages between the various nodes on the DataSpace 130, 130', include but are not limited to: Internet Small Computer System Interface (iSCSI), Small Computer System Interface (SCSI), Fiber Channel (FC), Infiniband (IB), Gigabit Ethernet (GE), Ten Gigabit Ethernet (10GE), and Synchronous Optical Network (SONET). Any messaging protocol, or combination of messaging protocols which allows for the communication of messages between the various nodes of a telecommunication network are intended to be within the scope of the invention.

In the preferred embodiment of the present invention, the DataSpace switches 100, 100' are coupled to working transmission medium 110 and spare transmission medium 111 configured in a bi-directional ring topology. In the preferred embodiment of the present invention, the working transmission medium 110 and spare transmission medium 111 are fiber optic cabling, but in other non-carrier class implementations, the transmission medium could be copper or even airwaves. The spare transmission medium 111, or what is commonly referred to as 'protect ring fibers' in the telecommunication industry, provide redundancy and greater reliability as a mechanism to re-route traffic in the opposite direction in case working transmission medium 110 fails. In addition, if a switch 100, 100' on the working transmission medium 110 fails, the back-up switch 100, 100' on the spare transmission medium 111 will automatically take over.

The present invention can be deployed on a fiber optic network with a modified version of a standard protocol such as, but not limited to SONET. SONET is a standard way to multiplex high-speed traffic from multiple vendors multiplexing onto fiber optic backbone cabling. SONET is a four layered protocol. Layer 1 is the Photonic Layer, which converts electronic signals into optical signals and vice versa. Layer 2, the Section Layer, monitors the condition of the transmission between the SONET equipment and optical amplifiers. Layer 3 is the Line Layer, which synchronizes and multiplexes multiple streams, from multiple sources, into a single data stream in a uniform format. Layer 4 is the Path Layer which assembles and disassembles voice and data into frames. In the present invention, the Path Layer could use a modified addressing convention to identify which data packets are to be stored/cached on the DataSpace 130, 130' by continuously transmitting them on the storage/caching network for the life of the data packet. Dense Wavelength Division Multiplexing (DWDM) is a new high-speed, replacement technology for SONET which can also be used as the basis to create a DataSpace 130, 130'.

By increasing the size of a telecommunication network, and/or speed of the network elements, such as switches, bridges and/or routers, or by adding DataSpace switches 100, 100', a DataSpace 130, 130' is a highly scalable and load balanced data storage/caching solution without adding much complexity.

In the present invention, data integrity, recovery, and re-construction can be accomplished by a variety of methods in the case of transmission or equipment failure, or maintenance.

Re-Directed Data—In the event a DataSpace switch, or other hardware, is removed or ceases to function properly, the DataSpace switch responsible for sending data packet(s) to another DataSpace switch can re-route them to a back-up DataSpace switch, or another DataSpace. The process of re-directing data packet(s) can be manual and/or automated.

RAID-type Implementation—Critical data residing on a DataSpace may be protected using a similar method found in RAID algorithms. Separate and redundant DataSpaces can be used to implement the striping and/or mirroring of data across multiple DataSpaces. Under the proper mirroring configuration, if one DataSpace becomes inoperable or inaccessible, another DataSpace(s) can re-construct data and service requests as needed.

Integrity Node—A DataSpace integrity node can be placed on the DataSpace to check for any number of possible situations indicating corrupted or missing data. This node could be used in conjunction with the RAID-type Implementation for data recovery. The Integrity Node could be directed to look for: out-of-order packets (if ordering is required), and/or missing packets by performing packet count (if the number of packets is static), and/or CRC checking on segments of a DataSpace.

Alternative Data Storage—A DataSpace can export data packet(s) and/or data stream(s) to other storage devices as a safe-store method in the event a DataSpace needs to backup to a form of permanent storage. In addition, if data on a DataSpace becomes lost or corrupted, a DataSpace can re-construct the data from the safe-storage device. Examples of these safe-storage devices include disk drives, floppy drives, and/or optical drives.

Figure 2:
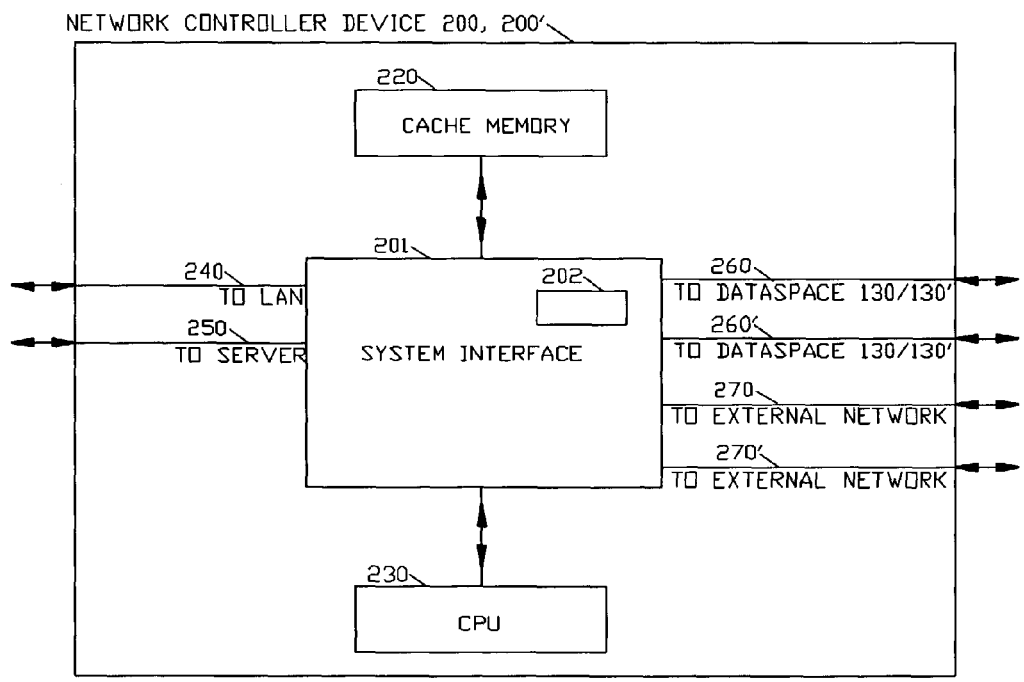
FIG. 2 illustrates a block diagram describing the intelligent network controller device used on the present invention's storage/caching system.

Referring to FIG. 2, the intelligent network controller device 200, 200' includes a Central Processing Unit (CPU) 230, data cache memory 220 which is used to support processing, a systems interface 201 (typically a Field Programmable Gate Array (FPGA) or Application Specific Integrated Circuit (ASIC))—which may include an optional computation engine 202, which can be used to accelerate operations such as RAID check sum calculations, encryption, compression, and data routing), and at least one communication port 270, 270' which is used to communicate with the external network, other intelligent network controller devices 200, 200', or other forms of data storage/caching, such as SANs, NAS, etc., or other peripherals. At a minimum, the intelligent network controller device 200, 200' would also include a communication port 260, which is used to retrieve data from a DataSpace 130, 130'. Optionally, it may include a server communication port 250 used to connect with servers, and/or a LAN communication port 240 may be included for connection to a LAN, and/or a communication port 260' for sending data to another network controller device 200, 200'. The intelligent network controller device 200, 200' may include additional communication ports of any of the previously described, as required. The intelligent network controller device 200, 200' is not limited to the types of communication ports previously described.

More than one of the above communication ports 240, 250, 260, 260' 270, 270' may be combined into a single communication port. Also, each of the communication ports 240, 250, 260, 260', 270, 270' may be operating on a different protocol, such as but not limited to iSCSI, Infiniband, Fiber Channel, SONET, etc., or proprietary protocols. It should be appreciated to one skilled in the art that the term 'communication port' is intended to be construed broadly to include any combination and sub-combination of different communication ports for allowing the data and messaging communication using appropriate protocols over a telecommunication network.

The intelligent network controller device 200, 200' is programmed to be capable of receiving and processing requests for data, such as but not limited to, copying, mirroring, backing-up, performing RAID data check sum functions, data routing, administrative functions, encryption, compression, and forwarding data to a client, and/or another DataSpace 130, 130', and/or physical disks intended for data storage/caching.

Optionally, the storage/caching management and administration functionality of server 420, as depicted in FIGS. 4 and 6, may be integrated on the intelligent network controller device 200, 200' such that a client may communicate directly with the controller device 200, 200' through a front-end network 410 without involving a server 420.

It should be noted that the intelligent network controller device 200, 200' is capable of executing and fulfilling client requests, such as but not limited to, Hyper Text Transfer Protocol (HTTP), File Transfer Protocol (FTP), or Real Time Streaming Protocol (RTSP), etc.

The DataSpace 130, 130' hardware configuration may be modified depending upon the optimization of the application(s) required by the client upon a telecommunication network configuration. U.S. Pat. No. 6,148,414, Brown, et al, which is hereby incorporated by reference in its entirety for all purposes, provides useful device configurations for embodiments of the present invention.

As the present invention stores data in the form of data packets, PDUs, or protocol payloads, etc., continuously transmitted on the storage/caching network for the life of the data packet(s) and/or data stream(s), U.S. Patent Application 20010049740, which is hereby incorporated by reference in its entirety for all purposes, provides useful systems and methods for delivering data content, particularly streaming data content, to a client over a telecommunication network in response to a request for the data content from the client device.

In the following description, like reference numbers indicate identical or functionally similar elements. Additionally, the left-most digit(s) of a reference number identifies the drawing in which the reference number first appears.

Figure 3A:
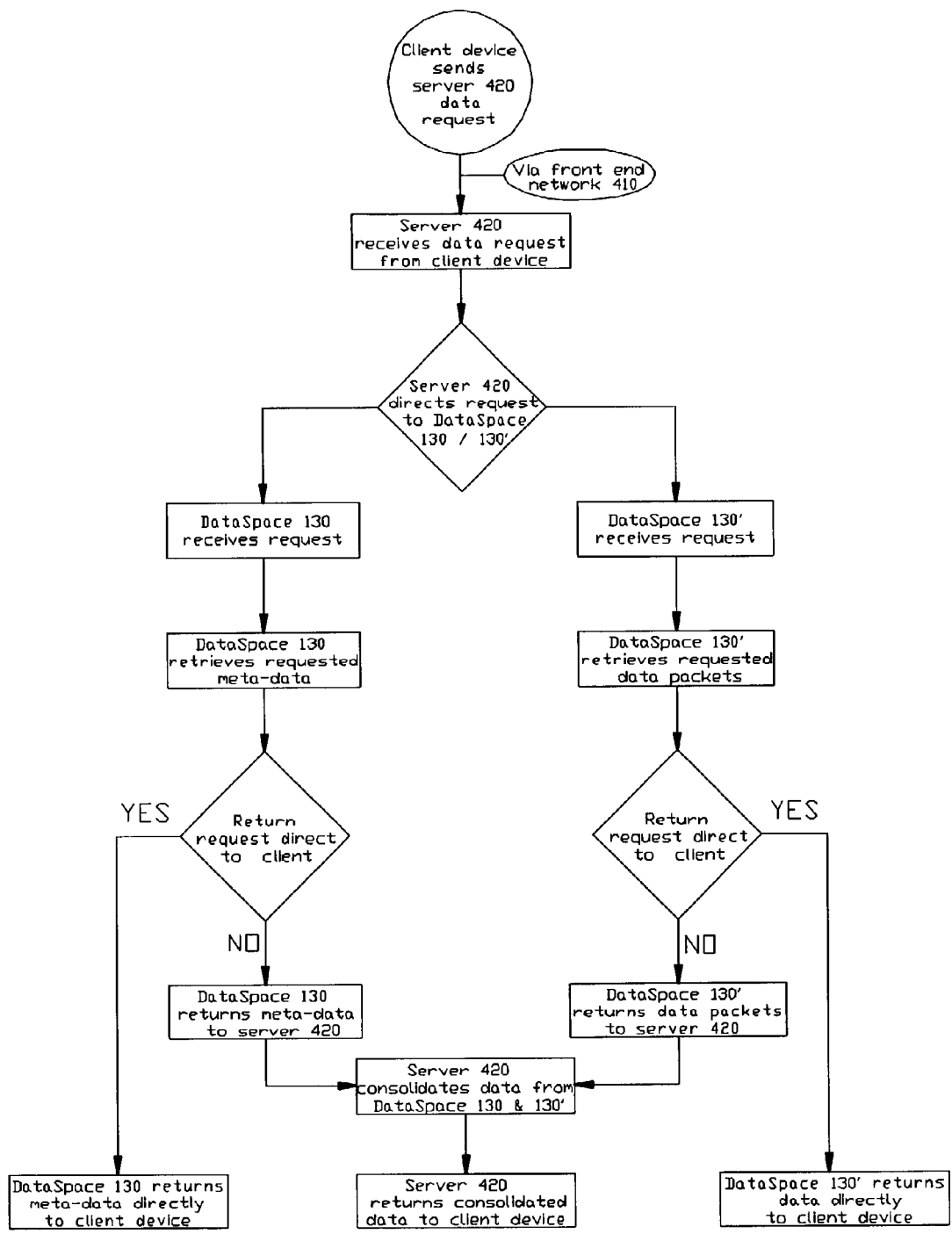
FIG. 3A is a flow chart describing a general process for storing and retrieving data and meta-data from the DataSpaces shown in FIG. 4.

FIG. 3A, is a flow chart for the network architecture as shown in FIG. 4, and illustrates the general process for retrieving data which is stored/cached in the form of data and meta-data packet(s) continuously transmitted on a DataSpace 130' and 130 respectively. Metadata is "data about data" which allows computers to process information more effectively. The request for data and meta-data is mediated by server 420 in response to a request by a client device 401, 402, 403, 404, 405.

FIG. 4 illustrates an embodiment of a network topology of the present invention in which a client device, a personal computer 401, cable TV set-top box 402, PDA 403, ATM 404, radio 405, communicates through front-end network 410 to server 420 to request data stored/cached on DataSpace 130 and/or 130'.

When the data packet(s) and/or data stream(s) requested by a client device is not located on DataSpace 130, the server 420 communicates with the intelligent network controller device 200' which is located on another DataSpace 130'. The server 420 typically forwards a notification message over a back-end network 440 which is connected to the DataSpace 130'. The back-end network 440 may also be connected to another front-end network 410'. The telecommunication links between the networks 410, 130, 440, 130', 410' may include optical fiber, for example, but may be comprised of other mediums, such as but not limited to, fiber optic cable, Category 5 wire, coaxial cable, airwaves, ground waves, vacuum, space, etc.

FIG. 5 illustrates another embodiment of a network topology the present invention in which a client device, a personal computer 401, cable TV set-top box 402, PDA 403, ATM 404, radio 405, communicates through front-end network 410 to a DataSpace switch 100, 100' operating on DataSpace 130, 130' to request data stored/cached on DataSpace 130 and/or 130'.

When the data packet(s) and/or data stream(s) requested by a client device, a personal computer 401, cable TV set-top box 402, PDA 403, ATM 404, radio 405, is not located on DataSpace 130, the intelligent network controller device 200 located on a DataSpace 130 communicates with a intelligent network controller device 200' which is located on another DataSpace 130'. The intelligent network controller device 200 forwards a notification message over a back-end network 440 which is connected to the DataSpace 130'. The back-end network 440 may also be connected to another front-end network 410'. The telecommunication links between the networks 410, 130, 440, 130', 410' may include optical fiber, for example, but may be comprised of other mediums, such as but not limited to, fiber optic cable, Category 5 wire, coaxial cable, airwaves, ground waves, vacuum, space, etc.

FIG. 6 illustrates an embodiment of the present invention in which a client device 401' serves as a broadcast or repeater node in a DataSpace 130, 130'. A client device personal computer 401, cable TV set-top box 402, PDA 403, ATM 404, radio 405 communicates through front-end network 410 through server 420, to DataSpace 130, 130' to request data stored/cached on DataSpace 130 and/or 130' which is continually being updated by client device 401'. Client device 401' can be equipped with DataSpace switches 100, 100' and intelligent controller devices 200, 200' that allow it to store/cache data in the form of data packet(s), PDUs, and/or protocol packets, etc., which are transmitted back and forth between client device 401' and DataSpace 130, 130' for the life of the data packet(s), PDUs, and/or protocol packets. This embodiment of the present invention allows a client device 401' to continually broadcast current data.

The inventors have built two DataSpace prototypes. The first is a remote storage/caching system accessed by a client via iSCSI over a front-end network to a DataSpace. A "block-like file system" architecture typically found on traditional magnetic media was implemented on a DataSpace and integrated with an iSCSI target server on a DataSpace intelligent controller device. An iSCSI target server routed iSCSI block I/O operation requests from the client to the DataSpace instead of a traditional magnetic media device. The "block-like file system" on the DataSpace consists of data packets representing media blocks continuously transmitted for the life of the data packets.

The second prototype is remote storage/cache system accessed by a client device's web browser through an HTTP server integrated with a DataSpace intelligent controller device. The web pages and graphics requested by the client device's browser HTTP requests are retrieved from a DataSpace where they were previously stored/cached. The prototypes demonstrated the ability of a network to serve as a data storage/cache mechanism by continuously transmitting data packets between network devices.

DATASPACE PROTOTYPE ONE—FIGS. 7 through 11 illustrate the first DataSpace prototype. This prototype consists of two major components: a client device, specifically a PC that initiates DataSpace client requests, and two DataSpace prototype switches built on a PC platform. The code for this prototype was disclosed in U.S. Provisional Patent Application Ser. No. 60/366,803 ENTITLED SYSTEM AND METHOD FOR STORING/CACHING DATA ON TRANSMISSION INFRASTRUCTURE, previously incorporated by reference.

The DataSpace prototypes include a client device, such as, but not limited to, a personal computer, cable TV set-top box, PDA, that is capable of establishing and maintaining a network connection to the DataSpace. Chart 1 shows the data flow from an application to a prototype switch from a stack perspective:

CHART 1

| Layer | Stack Operation | Example Component |
|---|---|---|
| 1 | Application | For example: streaming video, editor |
| 2 | O/S | Linux |
| 3 | File System | O/S or File System |
| 4 | iSCSI | Intel iSCSI layer |
| 5 | TCP/IP | TCP/IP Network Stack |
| 6 | Ethernet/Physical | Ethernet |

The DataSpace prototype switch receives requests for data storage/caching operations and performs them on the DataSpace. The DataSpace prototype may also include load balancing, data integrity operations, and transfer of data to another data storage medium, such as, but not limited to, a physical disk farm or another DataSpace.

Since one goal of the prototypes is to demonstrate the compatibility to co-exist with existing and emerging standards and protocols, Internet Small Computer Systems Interface, iSCSI was selected as the key integration point for the first prototype. Others, such as, but not limited to Hypertext Transfer Protocol (HTTP), File Transfer Protocol (FTP), Real Time Protocol (RTP), Network Time Protocol (NTP), Post Office Protocol (POP3), etc., can be implemented as well since the primary software developed is built independent of delivery method to a server(s).

For the first prototype, Intel's iSCSI software was used for the following reasons. First, iSCSI is an acknowledged standard based upon two established technologies: SCSI and TCP/IP. Both of these technology standards are well integrated into existing computing systems and would make integration easier to accomplish with the initial prototype. Since iSCSI encapsulates the data storage/caching operations within TCP/IP packets, it will be simple to examine these packets upon receipt and translate them into DataSpace storage/caching operations.

The Intel iSCSI software was found in public source: www.sourceforge.com. Some minor modifications to the Intel source were necessary to provide interconnection to the DataSpace prototype system.

The DataSpace client application creates file operations that result in iSCSI transactions to an iSCSI target device which uses the DataSpace as a storage/caching device.

iSCSI protocol handles requests between a client and a target. In the first prototype the DataSpace switch is the target. The client loads a device driver for an iSCSI initiator. This device networks with the iSCSI target on the prototype switch. The client creates a disk partition and file system on the iSCSI device, which is currently done today with traditional SCSI devices. The client mounts the iSCSI device, then runs an application, or other programs, that use the iSCSI device driver to send disk operation requests to the DataSpace. The DataSpace iSCSI target routes the iSCSI requests to the DataSpace for action, and returns the response.

The DataSpace prototypes were built around the concept of representing disk blocks on a network in the form of continuously transmitted data packet(s). The prototypes were designed using 512 byte data packets. For example, if we wanted to install a disk that has 40,000 512 byte blocks, then we would create a DataSpace that has 40,000 512 byte data packets.

The client's file system uses the iSCSI initiator to issue read/write block request(s) on the iSCSI target device. Upon receipt of these block operation requests, the iSCSI target places the request into shared memory that is accessed by the DataSpace switch.

While the switch is processing DataSpace packets, it scans the memory table to determine if the DataSpace data packet currently in process has a request from the iSCSI target. If there is a request, for example, a block read, write, verify, etc., then 1) the operation is performed on the DataSpace packet, 2) the memory table is updated and 3) the packet is sent to the next DataSpace prototype switch.

Figure 7A:
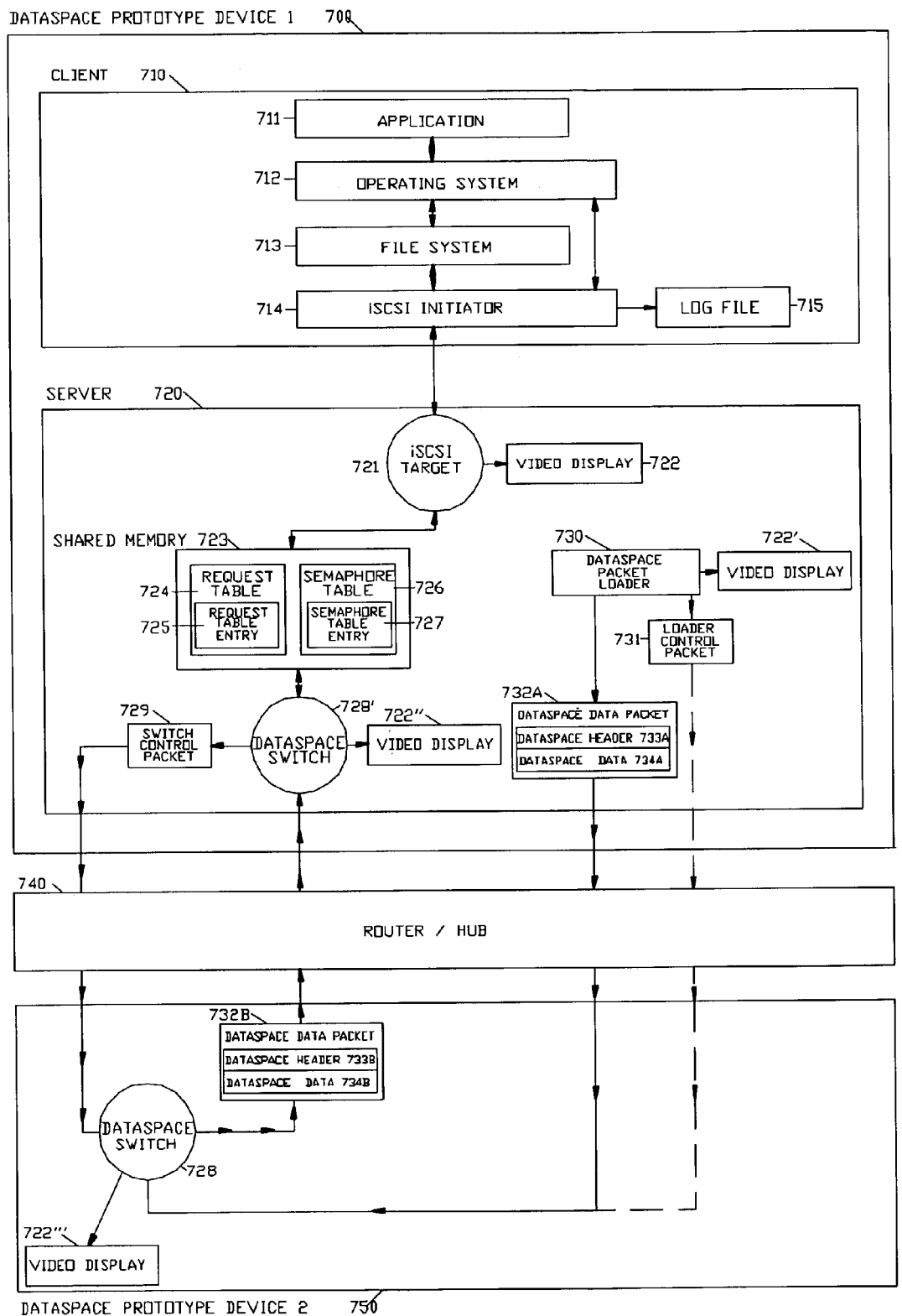
FIG. 7A illustrates the hardware and software components including the network loader used in the first prototype of the present invention.

The following describes the basic algorithm of how the operations occur on the prototype switch:

Initialize parameters
Setup connections to prototype switches
Continuous loop:
Listen on receiving port for DataSpace data packets
Read and assemble DataSpace data packet
Check the DataSpace iSCSI target request table
If request posted for DataSpace data packet, then perform request and update the iSCSI target request table
Send DataSpace data packet to next prototype switch
End of loop The following is a description of DataSpace Prototype One architecture as shown in FIG. 7A. This architecture emulates a distributed and shareable RAM disk, in which a DataSpace data packet 732A is used in place of a memory block on a computer RAM disk. Instead of read/writing data to a hard storage device, a client device, such as, but not limited to, a PC 401, read/writes data to data packets continuously transmitted on a network, microprocessor, data bus, or electronic circuit.

DataSpace Prototype One consists of two prototype devices 700, 750 configured as PC's miming Redhat Linux 7.2 operating system 712. Prototype devices 700, 750 are interconnected via standard Ethernet network to an Ethernet 10/100baseT router/hub 740. The DataSpace prototype device 1, 700 is one physical PC unit that consists of two logical devices, client device 710 and server device 720. The hardware used for DataSpace Prototype Device 1, 700 is a Dell Dimension XPS T700r personal computer. The hardware used for DataSpace Prototype Device 2, 750 is a Dell Optiplex GXpro personal computer. The router/hub 740 is a Dlink DI-704.

Intel iSCSI software is used to send and receive SCSI instructions between the file system 713 and/or operating system 712 and the iSCSI target device 721. During this operation, iSCSI initiator 714 creates informational and error messages to log file 715.

Intel iSCSI software was modified to allow the storage/caching device instructions from client 710 via iSCSI initiator 714 to server 720 to be performed on the DataSpace storage/ cache prototype. During operation of the iSCSI target 721, information or error logging messages are sent to video display device 722.

As part of the DataSpace Prototype One setup, the DataSpace data packet loader 730 creates and sends a configurable number of DataSpace data packets 732A to the prototype switch 728 via Ethernet. For example, if one desires to build a 10 MG DataSpace with 512 byte data storage/caching blocks, the DataSpace packet loader 730 will send 20,000 DataSpace data packets 732A to prototype switch 728.

For DataSpace Prototype One, each DataSpace data packet 732A is a TCP/IP packet formatted for subsequent iSCSI operations. DataSpace data packet 732A contains space reserved for the DataSpace header 733A, and a space reserved for a data storage/caching segment 734A. The DataSpace header 733A is for information pertaining to the operation of the DataSpace 130, 130', and also includes a field called "block ID". In addition to containing a "block ID", the DataSpace header 733A could also be modified to include additional meta-data associated with data contained in data segment 734A and other relevant DataSpace information. The DataSpace loader 730 inserts a unique block number into this field for each DataSpace data packet 732A created starting at value zero (0) and increasing by one (1). The DataSpace data storage/caching segment 734A reserves one "block-like file system" block per data packet for storing/caching data.

DataSpace data packet 732A becomes a DataSpace data packet 732B once data has been written to header 733A (which becomes a 733B) and data storage/caching segment 734A (which becomes a 734B).

After all the required DataSpace data packets 732A have been created and sent by the DataSpace loader 730 to prototype switch 728, the DataSpace loader 730 creates and sends out a DataSpace loader control packet 731 to prototype switch 728. This loader control packet 731 contains the number of packets created for the DataSpace by the DataSpace loader 730. Like other DataSpace data packets 732A used for the prototype, once the DataSpace loader control packet 731 is sent to prototype switch 728, it will be continuously transmitted on the DataSpace.

DataSpace loader 730 creates and sends out DataSpace data packets 732A to the prototype switch 728. Prototype switch 728 receives and processes (see Chart 3 below) DataSpace data packets 732A and sends them onto the next prototype switch 728'. These DataSpace data packets 732A are continuously transmitted on the DataSpace, and available for read/write operations.

The following chart depicts the steps for the operation of the DataSpace packet loader 730.

CHART 2

DATASPACE PACKET LOADER OPERATION STEPS

1. Startup and initialization
2. Establish TCP/IP connection to other DataSpace prototype switch.
3. Begin sending DataSpace data packets equal to the number of DataSpace data packets specified in the program startup parameters.
4. Create new DataSpace data packet and insert the block number starting with value zero (0) for first block and incrementing by one (1) thereafter.
5. Insert into DataSpace packet with TCP/IP address information for a DataSpace prototype switch.
6. Send new DataSpace packet to the DataSpace prototype switch specified in the program startup parameters.
7. Repeat process starting at Step 4 until all DataSpace packets requested in the startup parameters have been created and sent CHART 2-continued

DATASPACE PACKET LOADER OPERATION STEPS

8. Create a DataSpace informational packet by placing a value equal to the number of DataSpace data packets into the information packet. Add the TCP/IP address information for a prototype switch and then send to the DataSpace prototype switch specified in startup parameters.

During operation, the DataSpace loader 730 provides information or error logging messages to video display device 722'.

All the DataSpace data packets 732A, 732B, loader control packets 731, and switch control packets 729 will be continuously transmitted on the DataSpace network from prototype switch 728 to prototype switch 728' to prototype switch 728 to prototype switch 728', etc. This continuous "reverberation" of DataSpace data packets 732A, 732B, 729, 731 between prototype switches 728 and 728' illustrates one of the key components of the DataSpace concept.

Figure 7B:
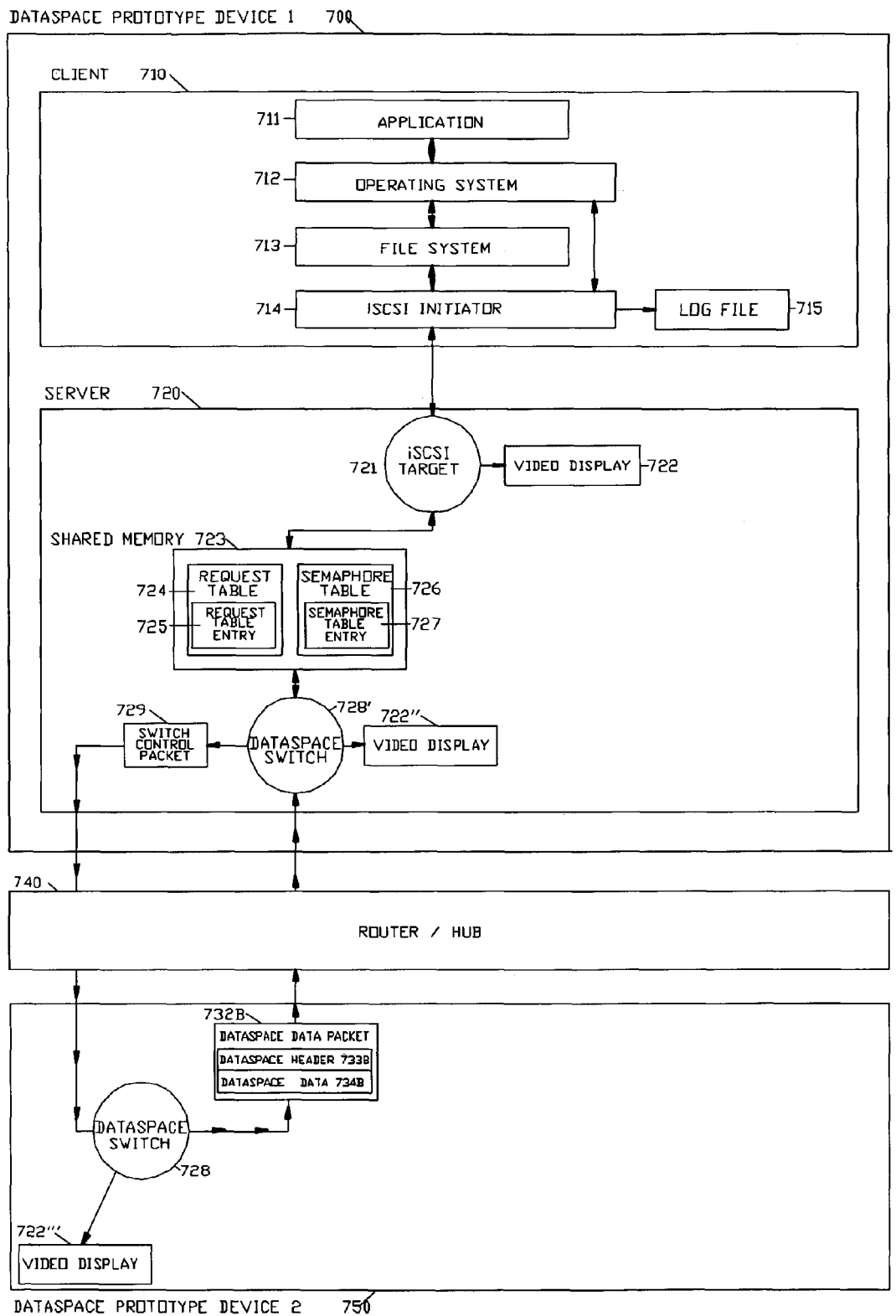
FIG. 7B illustrates the architecture of the first prototype of the present invention.

The following is a detailed description of the function of prototype switches 728, 728' as shown in FIG. 7B.

Prototype switch 728' is configured as a switch running in the normal mode and performs the operations as described below in Chart 3:

CHART 3

THE STEPS FOR THE PROTOTYPE SWITCH (NORMAL MODE)

1. Startup and Initialization
2. Attach or create request and semaphore tables.
3. Establish TCP/IP connection to other DataSpace prototype switches. Once connected, send a control packet to next DataSpace prototype switch.
4. Begin listening and receiving DataSpace packets.
5. For each packet received, create a new DataSpace packet to be sent to the next DataSpace prototype switch.
6. Scan the request table to see if a request exists for the particular DataSpace packet received. If a request in the request table exists, then perform the required operation as specified in the request's operation field.
6a. If the operation field indicates is a READ request, then 1) copy contents in the DataSpace packet received into the request table and 2) copy contents of received DataSpace packet into new DataSpace packet.
6b. If the operation is a WRITE request, then copy contents of the request table into the new DataSpace packet.
6c. If the operation is a VERIFY request, then copy contents of DataSpace packet received into the new DataSpace packet.
6d. If the operation is an INFORMATION request, then 1) copy contents of the DataSpace packet received into the request table and 2) copy contents of received DataSpace packet into new DataSpace packet.
6e. ALL requests upon completion will have the operation field changed to indicate the operation is complete.
7. If no request exists in the request table for a DataSpace packet, then copy contents of DataSpace packet received into the new DataSpace packet.
8. Update new DataSpace packet with TCP/IP address information for the next Prototype switch.
9. Update or increment any counters or operation parameters in the new DataSpace packet.
10. Send new DataSpace packet to next Prototype switch.
11. Repeat process starting at step 5 until Prototype switch is terminated.

As part of a prototype switch's 728, 728' startup operation, once a TCP/IP network connection has been established with its next prototype switch 728, 728', it sends out a prototype switch control packet 729 onto the DataSpace, which is continuously transmitted for the life of the DataSpace. For example, prototype switch 728' sends its switch control packet 729 to prototype switch 728 and prototype switch 728 sends its switch control packet 729 to prototype switch 728'. During the development of the prototype, the switch control packet 729 was used for debugging and testing purposes. It can also serve as a "pulse" indicating the status of the DataSpace 130, 130', contains switch specific information to be used by other DataSpace devices for management, performance, and analysis operations.

When an application 711 such as "vi", a UNIX-based text editor, is used for editing a file that is stored/cached on a DataSpace, it results in several file system requests to the operating system 712 and/or file system 713. These requests result into iSCSI instructions that are sent from the iSCSI initiator 714 to the iSCSI target 721 in the logical server device 720. The iSCSI target 721 is the modified Intel iSCSI target software containing added DataSpace functionality.

When iSCSI target 721 receives an iSCSI request from the iSCSI initiator 714, it translates the iSCSI request into a DataSpace request(s) and places the request(s) as entry(ies) 725 into the DataSpace request table 724. The request table 724 contains a configurable number of re-usable table entries 725. For most of the prototype testing, 40 shared memory entries were created for use.

The DataSpace also uses a semaphore table 726 that contains an associated semaphore table entry 727 mapped to each DataSpace request table entry 725. The prototype switch 728', iSCSI target 721, and the DataSpace software test tool have access to write, read and modify request table entries 725 in the request table 724. As a result, the prototype switch 728', iSCSI target 721, and the DataSpace software test tool perform lock and unlock operations to a specific DataSpace request table entry 725 by applying the appropriate semaphore operation on the associated DataSpace semaphore table entry 727. The use of semaphores is a common compute method used to manage access to shared resources such as memory table entries. By implementing semaphores, resources can not simultaneously accessed by more than one competing process; thus, removing the potential for memory corruption.

The DataSpace request table 724 and the DataSpace Semaphore table 726 can be created by either the prototype switch 728', the iSCSI Target 721, or the DataSpace software test tool.

The DataSpace request operations, as shown in Chart 4 below, can be performed on the DataSpace request table 725 entry depending on the received iSCSI request:

CHART 4

DATASPACE OPERATIONS DEPENDING ON ISCSI REQUESTS

1. Read - Read data from data segment of the DataSpace data packet into DataSpace request table entry.
2. Write - Write data from block data in DataSpace request table entry into associated data segment of DataSpace data packet.
3. Verify - Verify a specific DataSpace data packet exists.
4. Information - Obtain information from DataSpace loader control data packet into DataSpace request table entry. Used to obtain size of DataSpace prototype for the DataSpace components and DataSpace software test tool.

During operation of the prototype switch 728' in normal mode, it can provide information or error logging messages to video display device 722".

During operation of the prototype switch 728 in passthru mode, it can provide information or error logging messages to video display device 722".

When the prototype switch 728 operating in passthru mode receives a data packet 732A and/or 732B, it performs the operations as shown in Chart 5 below:

CHART 5

PROTOTYPE SWITCH OPERATION (PASSTHRU MODE)

1. Startup and Initialization
2. Attach or create request and semaphore tables.
3. Establish TCP/IP connection to other DataSpace prototype switches. Once connected, send a control packet to next DataSpace prototype switch.
4. Begin listening and receiving for DataSpace packets.
5. For each packet received, create a new DataSpace packet to be sent to the next DataSpace prototype switch.
6. Copy contents of DataSpace packet received into the new DataSpace packet.
7. Update new DataSpace packet with TCP/IP address information for the next Prototype switch.
8. Update or increment any counters or operation parameters in the new DataSpace packet.
9. Send new DataSpace packet to next Prototype switch.
10. Repeat process starting at step 5 until Prototype switch is terminated.

Figure 8:
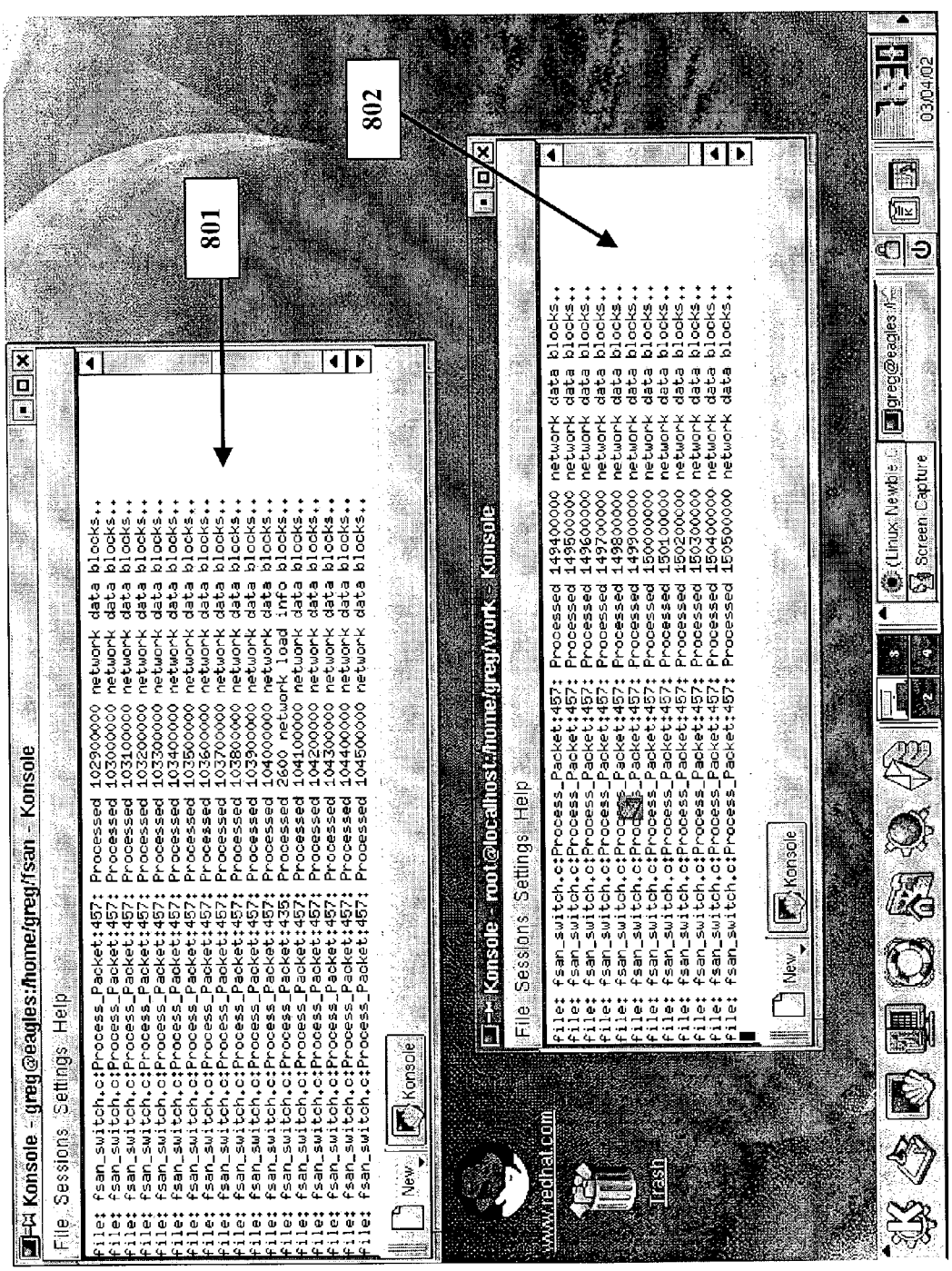
FIG. 8 shows screenshots of output from the DataSpace hardware and software used in a first prototype of the present invention.

FIG. 8 is a screenshot showing output from the hardware and software used in the previously described prototype of the present invention. Window 801 shows activity on the DataSpace prototype as video display 722''', as shown in FIGS. 7A and 7B from DataSpace prototype device 2, 750, specifically the prototype switch 728. Window 802 shows activity on the DataSpace prototype as video display 722", as shown in FIGS. 7A and 7B, from DataSpace prototype device 1, 700, specifically the prototype switch 728' component.

Figure 9:
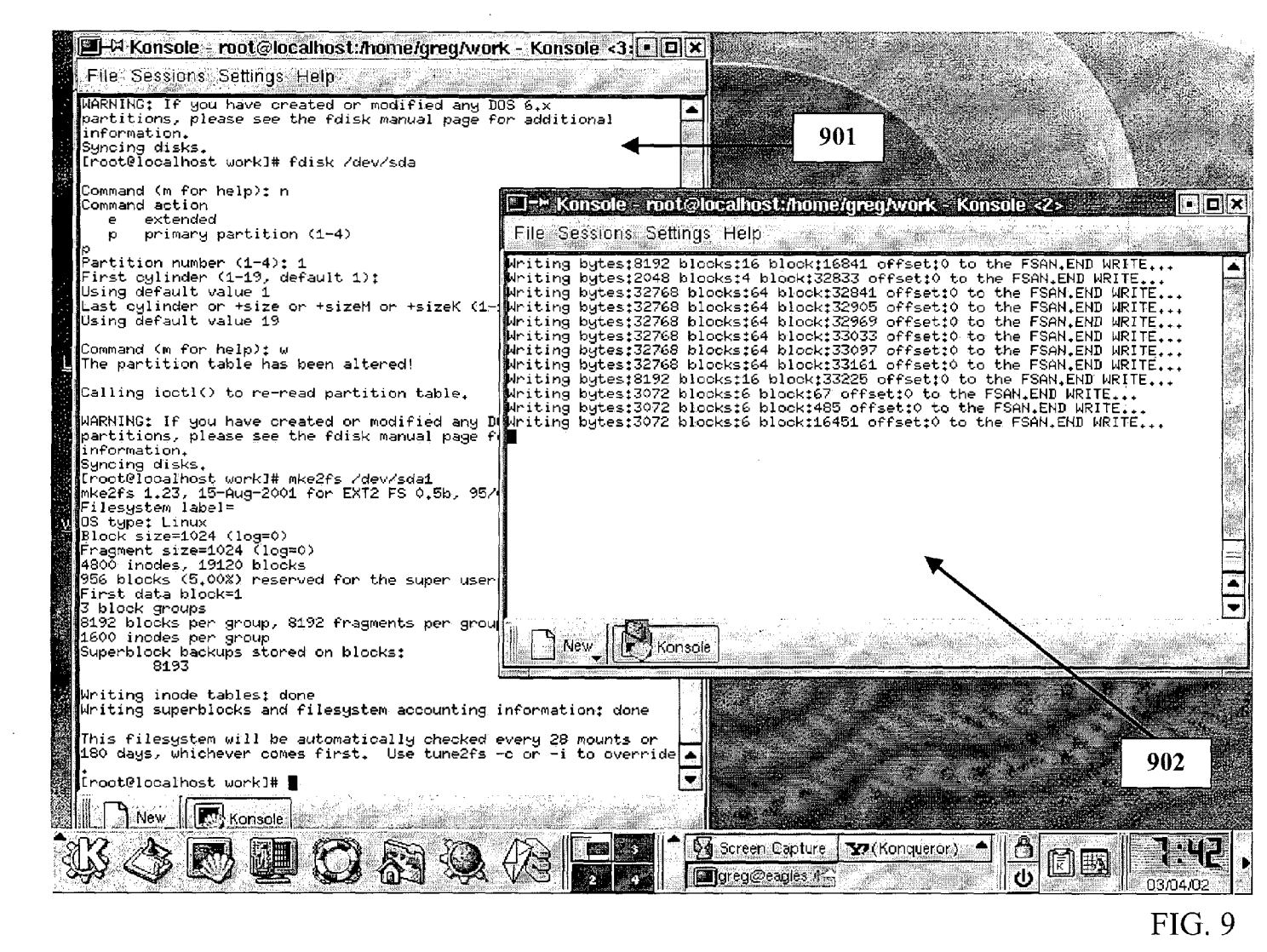

FIG. 9 is a screenshot showing output from the hardware and software used in the previously prototype of the present invention. Window 901 shows activity on the DataSpace prototype as video display 722', as shown in FIG. 7A during the creation of the disk partition and the making of the file system 713. Window 902 shows activity on the DataSpace prototype as video display 722, as shown in FIGS. 7A and 7B, from the iSCSI Target 721.

Figure 10:
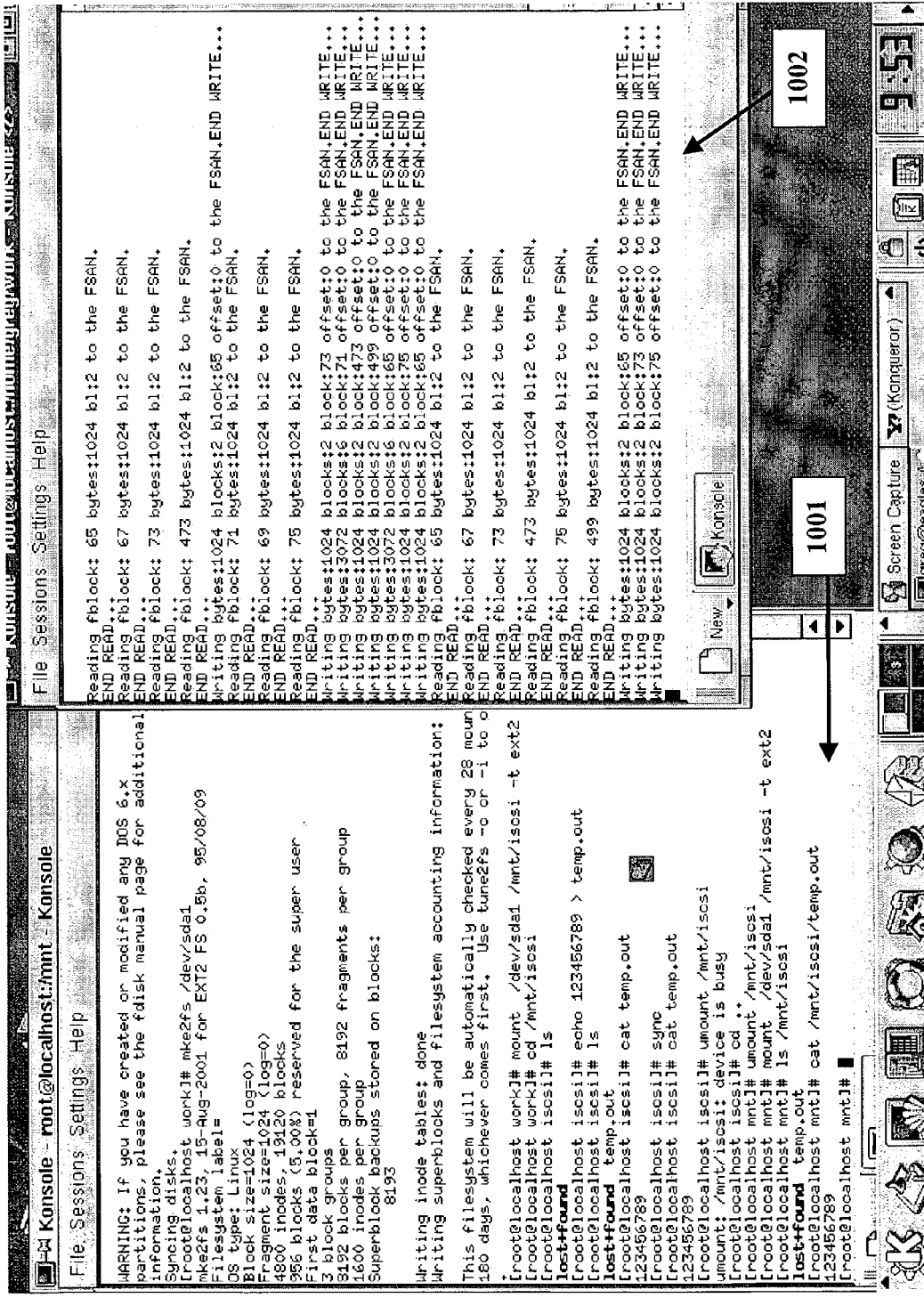
FIG. 10 shows screenshots of output from the DataSpace hardware and software used in a first prototype of the present invention.

FIG. 10 is a screenshot showing output from the hardware and software used in the previously described prototype of the present invention. Window 1001 shows activity on the DataSpace prototype as video display 722', as shown in FIG. 7A during the mounting of the file system 713, the synchronization (flush file system buffers) of the file system 713, the unmounting of the file system 713, and the remounting of the file system 713 on the DataSpace prototype. Window 1002 shows activity on the DataSpace prototype as video display 722, as shown in FIGS. 7A and 7B, from the iSCSI Target 721.

Figure 11:
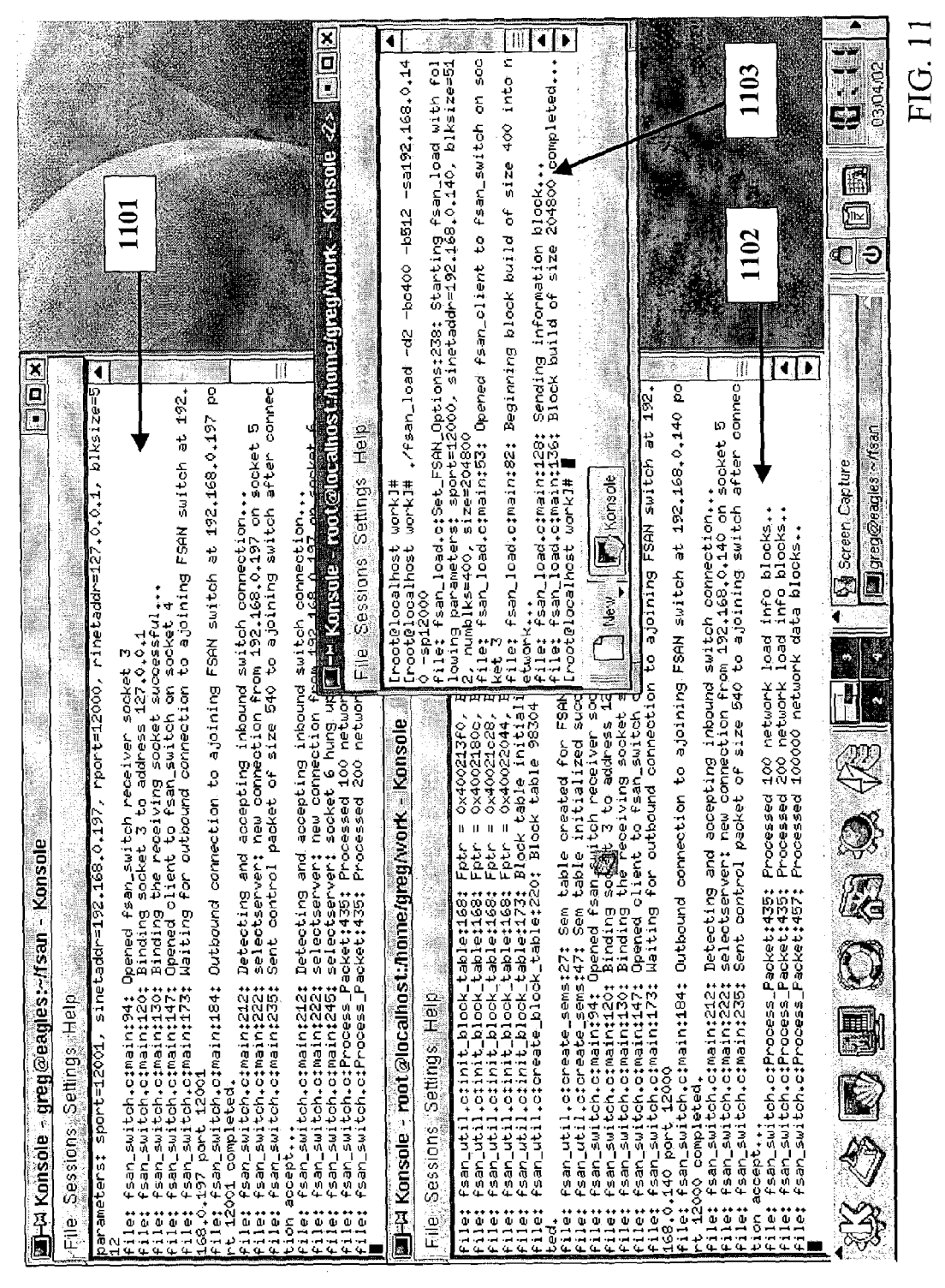

FIG. 11 is a screenshot showing output from the hardware and software used in the previously described prototype of the present invention. Window 1101 shows activity on the DataSpace prototype as video display 722''' and 722" respectively, as shown in FIGS. 7A and 7B, during the set-up of prototype switches 728, 728'. Window 1102 shows activity on the DataSpace prototype as output 722', as shown in FIG. 7A from the DataSpace packet loader 730. Window 1103 shows informational output of DataSpace packet loader 730 to video display 722'.

DATASPACE PROTOTYPE TWO—DataSpace Prototype Two integrates a DataSpace with an open-source Apache Hypertext Transfer Protocol (HTTP) web server found at http://www.apache.org. In this DataSpace prototype, all hardware and software components were used in DataSpace Prototype One with the exception of the iSCSI components.

In addition to the DataSpace Prototype One components, two other software programs were created. The first program provides the method for uploading Hypertext Markup Language (HTML) web pages, Graphic Interchange Format (GIF), and Joint Photographic Experts Group (JPEG) images/ graphics to the DataSpace for storage/caching. After the DataSpace has been initialized, including the loading of data packets in the manner outlined in the first DataSpace prototype, the HTML, GIF and JPEG files and graphics can be uploaded to the DataSpace.

The second program is a Common Gateway Interface (CGI) program that is responsible for processing the CGI requests received by the Apache HTTP web server from the client. The CGI program extracts the requested HTML, JPEG or GIF information stored/cached on the DataSpace by issuing a request to the DataSpace switch. The DataSpace switch upon receipt of the request from the CGI program fulfills the request and returns the information requested (HTML, JPEG or GIF format) back to the CGI program. The CGI program returns the information requested (HTML, JPEG or GIF format) back to the Apache HTTP web server, which forwards the response back to the requesting client.

The actual Apache source code may be modified, or a specific module within Apache source code or framework may be created for tighter and more efficient integration with the DataSpace that would eliminate implementation of a CGI program. Also, a more detailed and sophisticated method may be implemented to increase server functionality by storing associated meta information on the DataSpace, including, but not limited to, multiple information identification indicators (filename, serial number, descriptor), description, key words, size, author, time of upload, geographic tag, access rights and expiration date.

In addition, since CGI is an established method used for adding or extending HTTP server functionality, a similar prototype may be built with any number of web server technologies, including, but not limited to, a small proprietary HTTP server specifically developed for use with a DataSpace, or other commercially available server like Microsoft's Internet Information Server (IIS).

Similar levels of DataSpace and server integration may be built using other protocols, including, but not limited to, File Transfer Protocol (FTP) for accessing/storing/caching files, Real Time Protocol (RTP) for the transport of real-time data, including audio and video, Network Time Protocol (NTP), Post Office Protocol Version 3 (POP3) for accessing/storing/ caching e-mail, Real Networks Protocol for accessing/storing/caching streaming media, Apple's QuickTime Streaming server for accessing/storing/caching streaming media, etc.

Figure 12:
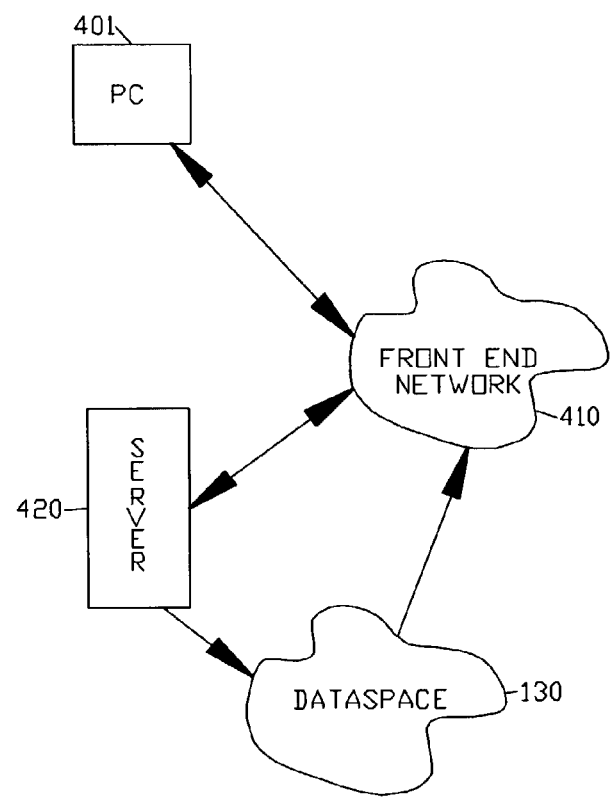
FIG. 12 illustrates the architecture of the second DataSpace prototype.

FIG. 12 illustrates the embodiment of the network topology of DataSpace Prototype Two in which a client device, a personal computer 401 communicates through front-end network 410, to server 420 to request data stored/cached on DataSpace 130. This prototype was operated locally, where the front end network 410 was a LAN, and was also operated remotely, where the front end network 410 consisted of an ISP and the public telecommunication network(s).

Figure 13:
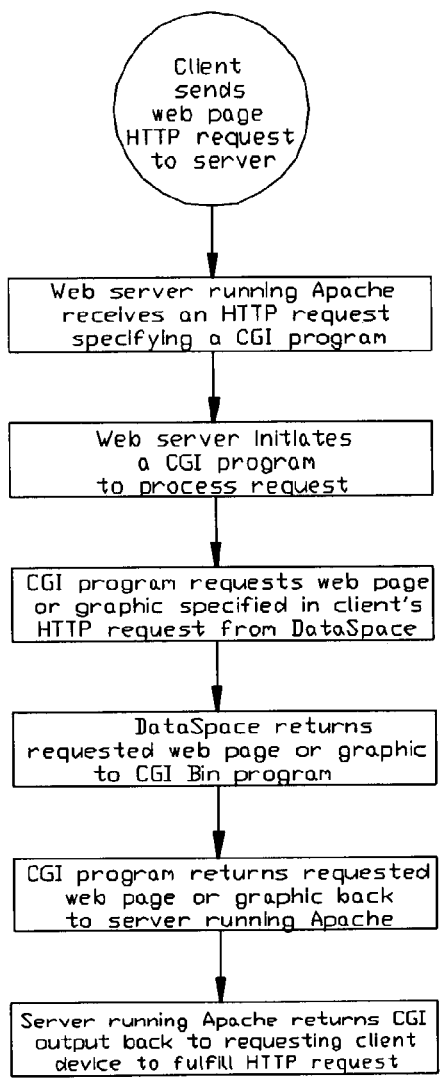
FIG. 13 is a flow chart describing the general process used in the second DataSpace prototype to retrieve data stored in the form of data packets.

FIG. 13, is a flow chart for the network architecture as shown in FIG. 12, and illustrates the general process for delivering data stored/cached in the form of data packet(s) continuously transmitted on a DataSpace 130. The request for data is mediated by server 420, running Apache software, in response to a HTTP request by a client device 401. The server 420 running Apache software executes a CGI program in order to return the requested data to the client device 401.

Figure 14:
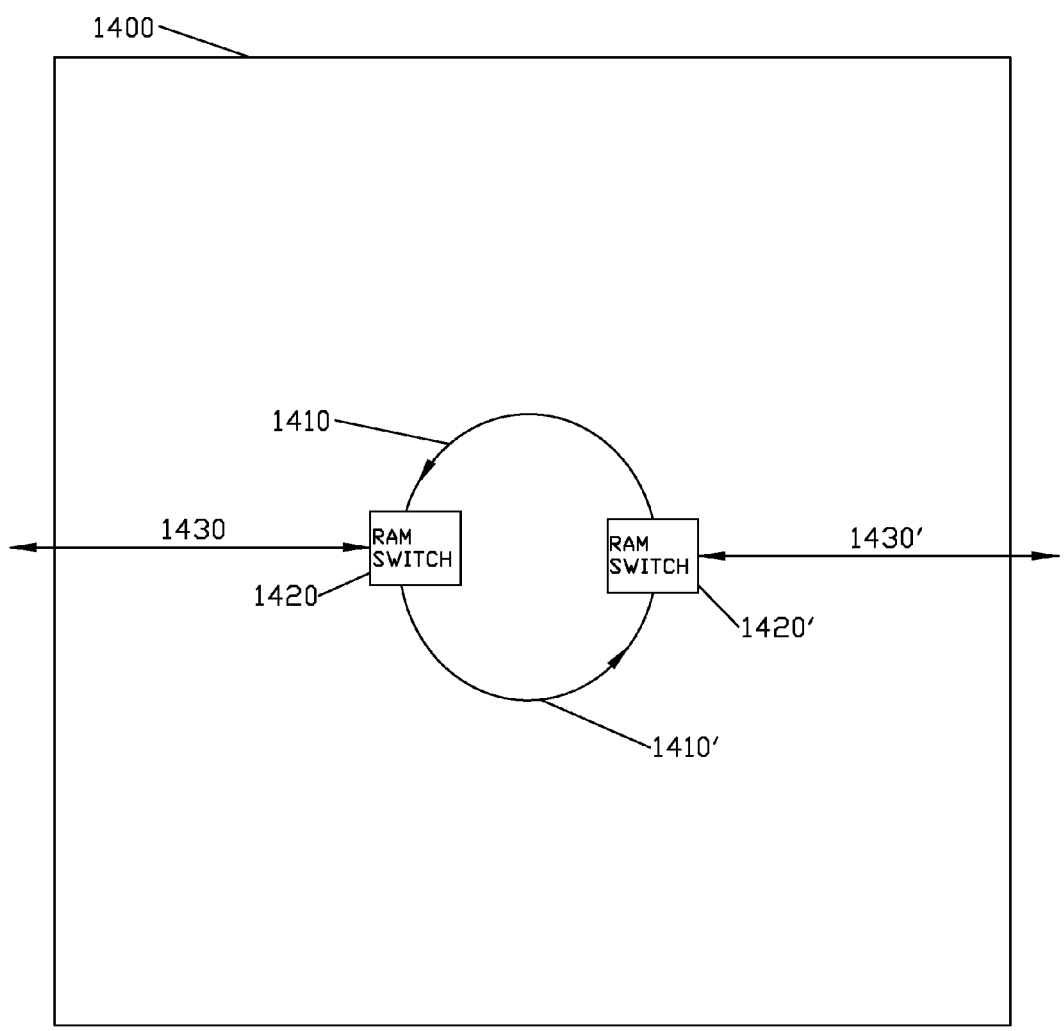
FIG. 14 is a block diagram describing the basic architecture of a DataSpace configured in the form of an electronic circuit.

FIG. 14 illustrates a DataSpace configured as an electronic circuit 1400. Electronic circuit 1400 is comprised of three basic components: (1) DataSpace Random Access Memory switches (RAM switches) 1420, 1420' as defined in FIG. 15; (2) transmission medium 1410, 1410'; and (3) data links 1430, 1430' which connect the DataSpace RAM switches 1420, 1420' to a compute device, telecommunication network, etc.

Electronic circuit 1400 stores/caches data in a similar manner described in FIGS. 4, 5, and 6, with the exception that data is stored/cached in the form of continuously transmitted data packet(s) and/or data streams without the use of a telecommunication network to interconnect the switches on a DataSpace.

The electronic circuit 1400 can be contained in many different form factors, such as, but not limited to carrier class soft switches, data network elements such as switches, routers, hubs, and bridges, programmable hardware with architecture similar to a Lucent Excel LNX programmable switch, host controllers, and client devices such as, but not limited to PLCs, and PCs 401, TVs 402, PDAs, 403, ATMs 404, radios 405, as shown in FIGS. 4, 5, and 6.

The electronic circuit 1400 may be configured to operate using an emerging technology known as XML switching/ routing. XML switching/routing is explained in more detail below in the applications section of the present invention.

Electronic circuit 1400 can be designed to use a protocol, such as, but not limited to, Small Computer System Interface (SCSI), to encapsulate data packets for storage/caching as previously discussed in the present invention.

Alternatively, electronic circuit 1400 can employ structured data streams to store/cache data. A structured data steam has been described in U.S. patent application Ser. No. 09/698, 793 entitled METHOD OF TRANSMITTING DATA INCLUDING A STRUCTURED LINEAR DATABASE to Melick, et al, previously incorporated.

In this embodiment of the present invention, the DataSpace RAM switches 1420, 1420' are coupled via transmission medium 1410, 1410'. A single pair of transmission mediums 1410, 1410' is shown, but the electronic circuit is highly scalable in a parallel manner and the DataSpace RAM switches 1420, 1420' may include additional ports to reverberate data over additional transmission mediums. A unidirectional flow between DataSpace RAM switches 1420 and 1420' is shown, but may be configured as bi-directional data flow.

The electronic circuit 1400 can have additional DataSpace RAM switches 1420, 1420' added to balance the load, or increase the number of nodes available for tapping into the data flowing on the circuit.

Data integrity on the electronic circuit 1400 can be accomplished by implementing RAID-type methods in which data packet(s), or data streams, are striped, check summed and mirrored on the same electronic circuit 1400, or across multiple electronic circuits 1400 operating in concert in order to enable data integrity and rapid data reconstruction in the case of a transmission failure.

The DataSpace RAM switches 1420, 1420' communicate and transmit data with other electronic circuitry, or microprocessors through data links 1430, 1430'. A single data link 1430, 1430' is shown for each DataSpace RAM switch 1420, 1420' respectively, but additional ports may be included in order to provide additional parallel data links.

The electronic circuit 1400 may be configured to operate as a photonic circuit, or as a circuit using pulse-based methods, similar to those described in U.S. Provisional Patent application 60/376,592, to Melick, et al, entitled High Number Base Encoded Ultra Wideband Over Guided Lines And Non-Guided Narrow Band Radio, previously incorporated by reference.

Figure 15:
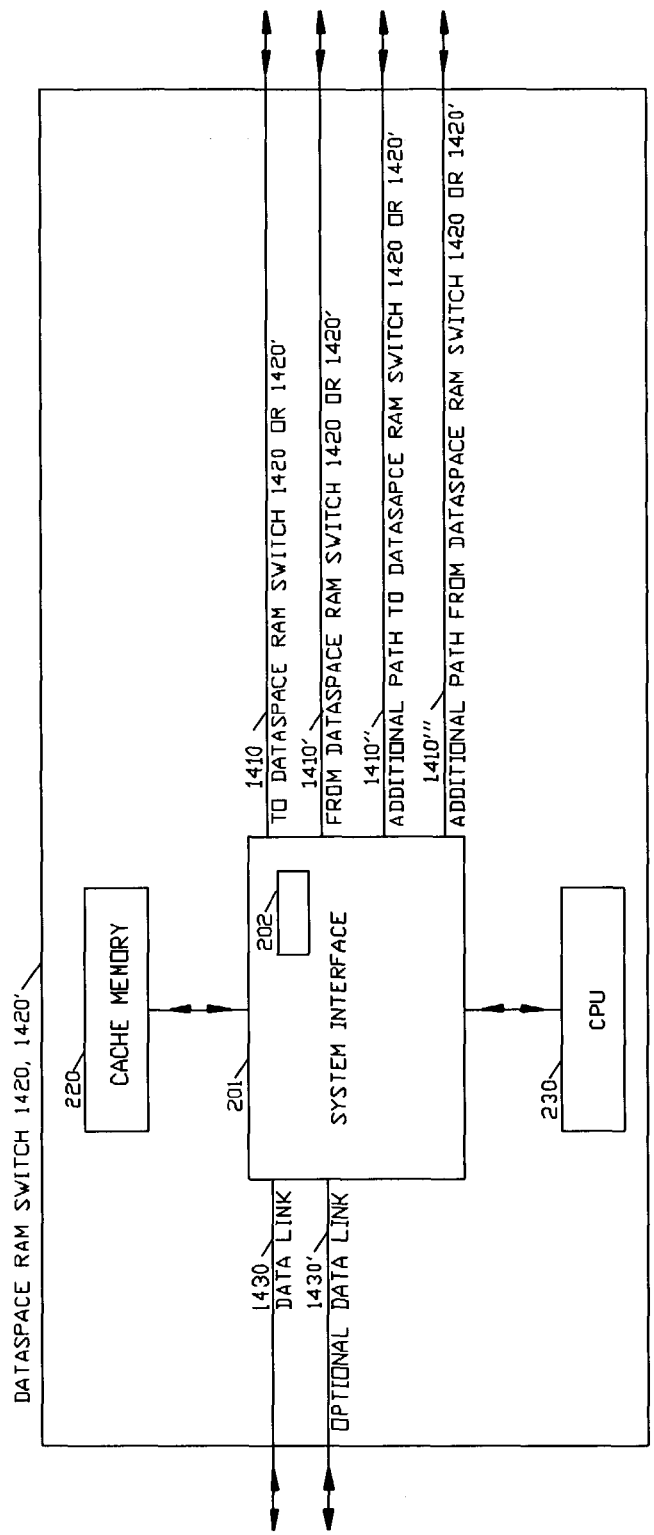
FIG. 15 is a diagram that illustrates the basic components of a DataSpace RAM switch shown in FIG. 14.

FIG. 15 illustrates the basic architecture of DataSpace RAM switch 1420, 1420'. The DataSpace RAM switches 1420 or 1420' include a Central Processing Unit (CPU) 230, a data memory cache 220 which is used to support processing, a systems interface 201, which may be configured in a device such as, but not limited to, a Field Programmable Gate Array (FPGA) or Application Specific Integrated Circuit (ASIC). The Systems interface 201 may include an optional computation engine 202, which can be used to accelerate computational operations, and at least one pair of transmission mediums 1410, 1410' coupled to another DataSpace RAM switch 1420 or 1420'. A DataSpace RAM switch 1420, 1420' may include additional parallel transmission mediums 1410", 1410'" to another DataSpace RAM switch 1420, 1420' to increase the throughput speed of the electronic circuit 1400 as described in FIG. 14. Data links 1430, 1430' connect DataSpace RAM switches 1420, 1420' to a compute device, telecommunication network, etc.

The DataSpace RAM switch 1420, 1420' is programmed to be capable of receiving and processing requests for data in the form of data packet(s) and/or data streams, such as but not limited to, copying, mirroring, backing-up, performing RAID data check sum functions, data routing, administrative functions, encryption, compression, and forwarding data to another DataSpace RAM switch 1420, 1420', or other RAM, or physical disks intended for data storage/caching.

DATASPACE APPLICATIONS—Applications of DataSpace technology can be applied to both wireline and/or wireless networks, and include, but are not limited to, a chaotic database, Domain Name Service (DNS), a storage/cache system for data, file systems, and meta-data, mobile data systems, high read use/decision support systems, content management and geographical routing, and as a support technology for stream querying and grid computing.

CACHING APPLICATION—Caching allows for more efficient use of high-latency physical storage mediums such as magnetic disks. By implementing a cache, time-costly disk I/O operations are minimized resulting in reduced access times and contention for disk resources. When data, such as file directory information is continually accessed on a typical storage device like magnetic media, it makes sense to store that information in a low-latency memory location such as cache. Using cache, once the first read to a disk is performed the cache is also updated with the content retrieved by the disk read request. As a result, subsequent read requests for the same data element previously retrieved will be served from the cache in lieu of performing another disk operation.

Cache can be co-located locally with the file system and/or operating system, or remotely on a storage system such as a Storage Area Network (SAN), traditional networked server, and storage cluster. In the case of remote storage devices, the cache can be located on the storage system and is delivered over a standard network transport, such as, but not limited to TCP/IP. Using the present invention to cache data on a DataSpace allows subsequent requests for data to a remote networked storage/caching device without having to traverse the entire network.

In addition, multiple DataSpaces can be implemented and configured to provide distributed caching.

CONTENT MANAGEMENT AND GEOGRAPHICAL ROUTING APPLICATION—Data that is highly accessed for Internet web sites and multi-media can be cached to many DataSpaces. For example, a DVD movie or series of movies can be stored/cached on a network closer to the edge or cached on other DataSpaces between the originating source and the user, and continuously transmitted indefinitely for quick access by users.

Combined with geographical routing information, data can be tailored for a user's demographics. A DataSpace can maintain information about users served via geographical routing information and intelligently cache data in relevant DataSpace(s) closest to the user.

FILE SYSTEMS APPLICATION—Traditionally, file systems typically store relevant information on the data storage/caching device they are managing. Sometimes this data is stored/cached in "superblocks", or blocks of data on a disk device. When file system information is stored/cached on a DataSpace instead of the actual disk, managing file systems would be more easily distributed, and many file system operations would become more efficient and faster.

MOBILE DATA SYSTEMS APPLICATION—When multiple entities or assets are in a mobile environment, such as, but not limited to people, vehicles, freight, luggage, military assets, etc., each of these can be nodes within a hybrid DataSpace. A hybrid DataSpace includes both wireless and wireline network transport mediums. Among the benefits of this are, (1) high-speed access to real-time data by DataSpace nodes; (2) faster data distribution to multiple DataSpaces; and (3) ease in adding additional DataSpace monitoring or intelligence nodes.

DECISION SUPPORT SYSTEMS APPLICATION—When data is characterized as high read/low write, traditional data systems require a central data store(s) to be updated before current data is available to users. Examples include, asset tracking, monitoring systems, telematics, and broadcast data. Also, central data store(s) may provide other access points via a distribution, or replication model, to other data storage/caching systems and/or devices.

A DataSpace provides immediate access to data for a large number of users without the costs normally incurred by adding access for many users to traditional data systems. A DataSpace is suited to this environment because the processing latency at a DataSpace node is negligible in comparison to the contention of many users vying for traditional storage/caching resources. When additional DataSpace resources are required to support additional users, the addition of DataSpace nodes allows for faster distribution of data rather than the traditional processing of data via a sophisticated distribution and/or replication environment that requires data to be completely distributed and/or replicated before it can become available to all users.

SEARCH ENGINE APPLICATION—The DataSpace may be configured for use as an Internet search engine. When a company, user, content provider, etc., wishes to provide searching capabilities for their data, such as but not limited to, keywords, languages, phrases, geographical location, time stamps, speech patterns, recording, video, graphics, meta information and other associated data elements, etc., it can be uploaded and stored on a DataSpace(s). DataSpace switches can be programmed to use various methods to search data using criteria, such as but not limited to, geographic region, languages, expiration of search information, keywords, meta information, patterns, categories, etc., and to control access and permission restrictions.

Current Internet search engines, such as but not limited to, Yahoo!, Metacrawler, Google, etc., could redirect search requests to a DataSpace, use the DataSpace to search and/or utilize a DataSpace as a resource for their own "bot" or information acquisition technologies. Users could subscribe to a DataSpace and quickly upload, change, add, delete, or modify search criteria and information stored on a DataSpace. When service providers use a DataSpace to update or "push" data they have more control on subsequent DataSpace search requests. For example, a web-site owner distributing information regarding their web-site to a DataSpace may want search results to be determined by timeof-day, day-of-week, special of the day, inventory counts, closeouts, pricing or other parameters. In addition, the web site owner may want to provide different results for different users including, but not limited to, the content, the language, and/or dialect based upon the origin of the DataSpace search request. A common example of time-of-day routing can be found in the telephony market where specific 800 numbers are routed based upon parameters such as time-of-day and/or originating call location. In these cases, many 800 number customers are allowed access to telephone systems that implement their routing decisions based on a myriad of reasons. Similarly, a DataSpace allows users to update specific information real-time on a DataSpace that would yield different search engine results.

If a service provider stores the actual web content on the DataSpace, a DataSpace could generate and return results based upon the content stored. For example, a web page stored on a DataSpace that contains an Iowa basketball sports story titled "Iowa Women Beat Purdue Men 90-3." In addition, the web content may contain other information keywords or meta-tags for search engine purposes, such as, "purdue, iowa, scores, sports, college, basketball", etc. When the DataSpace is searching for a request, it will evaluate all the information stored within a page, such as the actual score, title, or news story content itself in combination with, and/or information pertaining to searching stored in meta tags as previously described.

A DataSpace-based search engine could provide the ability to expire or restrict access to searching. This could allow for different levels of search capability for both the user and content provider. Examples include: (1) A news story with a related MP3 file has an expiration date for searching because the news story is no longer relevant; (2) versioning of content for different users; (3) access restrictions by ISP, IP address (range or specific), users; (4) geographic location, grouping, company, service etc.; (5) service level restrictions by content provider, user, DataSpace provider, DataSpace subscriber, etc.

Likewise, hosting providers or content providers, such as AOL, Microsoft, WorldCom, UUNet, Akamai, etc., could upload information about content, and store, service, manage, and create data directly on the DataSpace. This could be done automatically and dynamically at any time interval, or as changes are made to the content.

DOMAIN NAME SERVICES APPLICATION—Another application for the present invention is using a DataSpace as a mechanism to update and maintain Domain Name Services (DNS), or to be a DNS server itself. DNS information on a DataSpace could provide for instantaneous updates for DNS servers located as an example, in Botswana, the United States, and China simultaneously. Today, when an application or device needs to resolve a domain name, it typically goes to a DNS server, which is not updated in real-time.

A DataSpace may have global reach, and could be a centralized distribution system for DNS services. Registrars could update a DataSpace in near real-time, and ISP providers can use the DataSpace for up-to-date DNS resolution directly, or indirectly, for their customers. One benefit to using the present invention for real-time DNS services is having more dynamic capability for re-routing requests by time-of-day, load, geography, outages, type of request, etc.

LINEAR DATABASE APPLICATION—A complimentary technology to a DataSpace is Linear Databases. Linear Databases are described in U.S. patent application Ser. No. 09/698,793 entitled METHOD OF TRANSMITTING DATA INCLUDING A STRUCTURED LINEAR DATABASE to Melick, et al. A Linear Database defines a structure for data stored in the form of a data packet(s), and can be used as a universal data interchange method.

GRID COMPUTING APPLICATION—Grid computing is the application of many distributed computer resources in a network dedicated to a single problem at the same time. Among the cornerstones of grid computing are the cataloging and management of compute and network resources, and to provide access to these resources using application programming interfaces (APIs) and tools.

An example is collecting data, such as space radio signals at many collection points, and distributing the data to various compute facilities for processing. Depending on the task, compute resource(s) located on the grid may be needed for pure raw processing power or because it contains specific hardware and/or software developed to complete a specific task.

In addition, sets of data may be of interest to many different parties located on the gird for their own analysis and tasks. An example of this type of data would be weather data that would be useful to agriculture, aviation, defense and other private and public entities. This use of data can require many types of regulated/unregulated distribution data access methods. If an entity located on a grid wishes to use this kind of data, they either must pull it from a data store or have it pushed or delivered to them.

Grid computing is a methodology and architecture intended to create a system that easily integrates and automates some of the nuances specific to tasks that require high-contention devices, e.g. super-computer resources for sophisticated modeling. Super-computing resources are distributed to a few global locations relative to other types of available processing resources and typically require some form of scheduling and permission prior to acquiring the resource. The grid allows for sizeable tasks to be broken down into manageable sub-tasks that could be spread across multiple resources. By parsing these sub-tasks among different resources, one could reduce the total amount of work typically required of a super-computer oriented task and/or break a task up among different super-computer resources.

Depending on the application, sizes of the datasets used in grid computing can be quite large and range in size greater than 10 million objects representing gigabytes and terabytes of data. When dealing with different data use methods, distribution of resources and types of datasets, a DataSpace can aid in the processing of this data by caching and storing it on the network so that more than one compute resource can access it simultaneously. This would allow for the use of multiple resources for analyzing data interconnected by a DataSpace.

A DataSpace is not a replacement for current data storage methods, however it can provide persistence of data objects, which can be useful in a grid system configured for performing tasks across multiple systems relating to the same object. An example of object processing would be a series of interconnected systems providing services for travelers. The passenger "object" would be passed among different systems performing different functions, for example, booking, ticketing, baggage, security, billing, etc.

A DataSpace is also useful in the event that an object is cached for use by different systems. When tasks are serialized, once an object has been processed and placed on the DataSpace, the next available resource can perform the next task for the object without having to employ a sophisticated queuing scheme.

As referenced in other areas of the DataSpace and chaotic databases application, an object database could easily be developed for storing objects of different sizes and formats. In addition, a DataSpace provides a mechanism to store "object meta" information, such as processing history, processing performance, operation and measurement information, origin, access, etc.

A DataSpace can be useful for caching data used by many systems within the same timeframe. An example of this type of data would be the real-time monitoring and analysis by many different military systems for battlefield information. Using a DataSpace to store/cache the real-time battlefield data eliminates the need to send the data to a common store for analysis systems to pull from.

The predominant benefit a DataSpace provides to grid computing is the ability to add persistence to objects and data elements to make them readily available at the time a resource on the grid becomes available. A DataSpace can span different geographic locations and can be easily integrated into a grid. Within the context of grid computing, a DataSpace can be viewed as a large shareable RAM drive that can be easily accessed by all the interconnected grid devices.

CHAOS DATABASE APPLICATION—One of the problems with using traditional element storage systems such as a relational database is the need to define database elements such as, tables and indexes prior to the import, creation or storage of data elements. While advances in technologies such as XML and predictive data modeling are aiding in the effort to reduce the amount of pre-implementation design and planning required for the storage of data, they are all constrained by the underlying data access speed limits posed by magnetic media devices.

Another limit of traditional database systems is the requirement for a thorough understanding of the data to be received or stored. While in some instances this is a very easy task, in other situations it can be very difficult and challenging. There are two trends impacting data storage in the future. The first trend is that more data from more distinct and unknown organizations will need to be processed. Secondly, realizing that some data has a short lifetime of usefulness, a push towards analyzing data closer to real-time will increase the demand for minimizing the amount of resources and time spent performing traditional pre-implementation database activities.

A DataSpace may be configured to provide a new type of element storage system we call Chaos Element Base (CEB). The CEB is focused primarily towards an element storage system that supports intense queries, volatile storage elements with limited updates, the import of storage elements in their original format with little modification from many sources and formats, and the use of meta-data information related to the storage elements.

CEBs equip the end-user with the ability to perform their own queries and reporting thus reducing dependency on the IT department. Querying a CEB will employ a natural-type of access similar to those found on today's Internet search engines. Other advanced searching, querying and reporting applications may be layered on a CEB providing additional functionality. As an example, a SQL-type of query engine may be is layered on the CEB to provide end-users with an applicable SQL instruction set.

Another example of a type of querying application that can be implemented on a chaotic database is associated with the Stanford's Stream Data Manager (STREAM) systems being development at Stanford University. While STREAM systems will focus on continuous data feeds, the CEB focuses on providing a persistent data stream. Querying technologies developed for STREAM such as OpenCQ and NiagraraCQ, support continuous queries on data streams, and can be applied to a CEB.

Another area a CEB can be implemented is for the storage/caching and sharing of business objects. This is accomplished without converting an object into a traditional database thus reducing the complexity of integration. As a CEB stores data independent of formats, the storage of objects of different size and complexity are minimized in comparison to force-fitting data into traditional database technologies.

When data objects are frequently updated and shared with multiple systems it is essential to provide a method of locking to eliminate the risk of updating the same record simultaneously. There are several types of locking procedures that would be applicable to a CEB, including exclusive locks and read-only locks. These methods of locking can be implemented on a chaotic database using the "meta" area of data elements in the CEB architecture, which allows only one client access to a particular data at any given point, eliminating the risk of contention among clients.

In some cases, an object has a short lifespan and yet needs to be shared among disparate systems. A CEB can provide this level of functionality as well and also provide object expiration rules for object garbage collection typically found in object-oriented systems today.

When data is stored in its original format, it provides two advantages. The original context in which the data was received is preserved, which provides added meaning to the data, and the steps for importing data elements into a CEB are eliminated, or substantially reduced vs. a traditional relational database. The steps eliminated or reduced include: (1) pre-definition of data elements; (2) design of relational database SQL table and indexes; (3) creation of SQL table; and (4) the import of data and insertion into SQL table(s).

Data may be imported directly into a CEB, thus reducing the time, resources, and analysis typically required to load data into a traditional relational database. This is important when dealing with data that is real-time, time-sensitive and/or has a short-shelf life.

DATA WITHOUT A TRACE—In some applications it may be beneficial to delete without leaving a trace. When deleting information from a general computing device's traditional storage device, such as magnetic media-based disk drives, its existence is removed from the eyes of an operating system, file system and user, however, the fingerprint or physical properties of the data remain on the device. An example of a data trace includes pits created in magnetic media devices, such as disk drives. Unless additional safeguards are implemented, the data will remain in its original physical form on the storage unit until it is overwritten by another operation.

Today, special programs provide random generation of data to "wipe" a file from a disk. This makes it difficult, if not impossible, to reconstruct the data element once it has been wiped. These programs are slow since it requires numerous I/O operations to be performed on the disk as described in Norton's Wipe Info utility describing U.S. government wiping methods.

This utility combines several wiping and overwriting processes conforming to DoD (Department of Defense) document 5220-22-M, and the National Industrial Security Program Operating Manual, for the ultimate security level when eliminating data from digital media.

Overwrites the data with 00s
    Verifies the 00 overwrite
    Overwrites with FFs
    Verifies the FF overwrite
    Writes a random value, or a value that you choose from 00 to FF
    Verifies the random overwrite Re-verifies the random overwrite to ensure that it was written correctly Repeats as many times as you specify, up to 100

In situations where data needs to be quickly removed and its traces eliminated, a DataSpace provides this functionality. As a DataSpace stores/caches data on a telecommunication network's infrastructure, and/or an electronic circuit, data bus, or microprocessors RAM, all traces of data are eliminated once a DataSpace is shutdown, or the life of data packet(s) and/or data stream(s) has expired.

A DataSpace requires less time than traditional disk-wiping methods, because it eliminates excessive physical disk I/O's associated with traditional medias devices such as magnetic disk drives. In addition, when a DataSpace is shutdown, it can be configured in a manner where there is no remaining physical fingerprint or evidence of data packet(s) and/or data stream(s) previous existence.

COMPUTE APPLICATIONS—A DataSpace's unique architecture and use of continuously transmitted data packet(s) and/or data stream(s) can also be configured for various compute applications.

Figure 16:
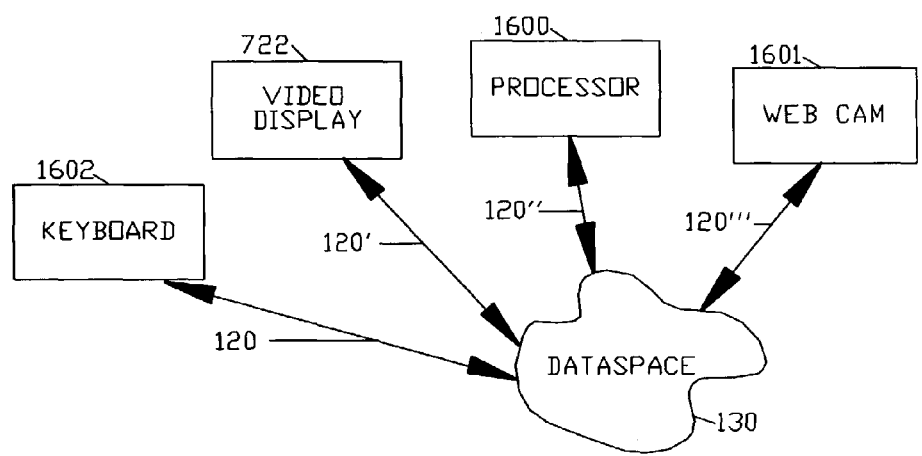
FIG. 16 illustrates the architecture of the present invention configured as a distributed compute device.

DISTRIBUTED COMPUTE DEVICE—An example of the architecture of a distributed compute device is illustrated in FIG. 16. In this embodiment of the present invention the data bus, such as, but not limited to Universal Serial Bus (USB), or Peripheral Computer Interface (PCI) encapsulated in data packet(s) is continuously transmitted between components of a compute device connected to a DataSpace. The compute device components include keyboard 1602, video display 722, and computer processor 1600, and are connected to DataSpace 130 via data link 120, 120', and 120" respectively. The keyboard 1602 is used to input commands into processor 1600. The video display 722 is used to view output from processor 1600. A peripheral device, a web cam 1601, is shown connected to the DataSpace 130 via data link 120'". In this embodiment of the present invention the DataSpace 130 serves as the memory and processor cache required by the processor 1600, and also serves as the data bus between the video display 722 and processor 1600.

In this embodiment of the present invention, the general flow is shown in Chart 6.

CHART 6

FLOW FOR DATASPACE ADAPTED AS DISTRIBUTED COMPUTE DEVICE

| | |
|---|---|
| 1) | Web cam 1601 generates a digital video signal. |
| 2) | Digital video signal is encapsulated in a data packet(s) and/or data stream(s). |
| 3) | Data packet(s) and/or data stream(s) are continuously transmitted on a DataSpace 130. |
| 4) | Processor 1600 processes the data packet(s) and/or data stream(s) being received from web cam 1601 and outputs processed video signal data onto DataSpace 130. |

CHART 6-continued

FLOW FOR DATASPACE ADAPTED AS DISTRIBUTED COMPUTE DEVICE

| | |
|---|---|
| 5) | Display 722 receives and ignores raw output from web cam 1601. |
| 6) | Display 722 receives and displays processed output from processor 1600. |

As an example, the bus may be encapsulated in Lightwaves Data Link (LDL). LDL is a proprietary protocol based on Simple Data Link (SDL), which is a variable length Asynchronous Transfer Mode (ATM) protocol. This protocol adapted for use in a DataSpace is discussed in detail later in the present invention. The DataSpace Version octet in the LDL private area of the protocol can be used in a DataSpace distributed compute device to indicate the manner data contained within the LDL payload is to be processed, and if it is destined for a particular compute component connected to a DataSpace 130.

The following chart illustrates the layout for a variable length DataSpace LDL protocol bus frame.

CHART 7

VARIABLE DATASPACE LDL BUS FRAME

| LDL Header | | | | | | |
|---|---|---|---|---|---|---|
| LDL | Payload | LDL Private Area | | | | LDL Check |
| Payload Data Length | Length CRC | LDL Private Length | DataSpace Version | DataSpace Frame ID | LDL Payload Bus Area | Private & Payload CRC |
| 2 octets | 2 octets | 1 octet | 1 octet | 4 octets | <=65,535 octets | 4 octets |

Alternatively, the bus frame described in Chart 7 can be a fixed length.

Figure 17:
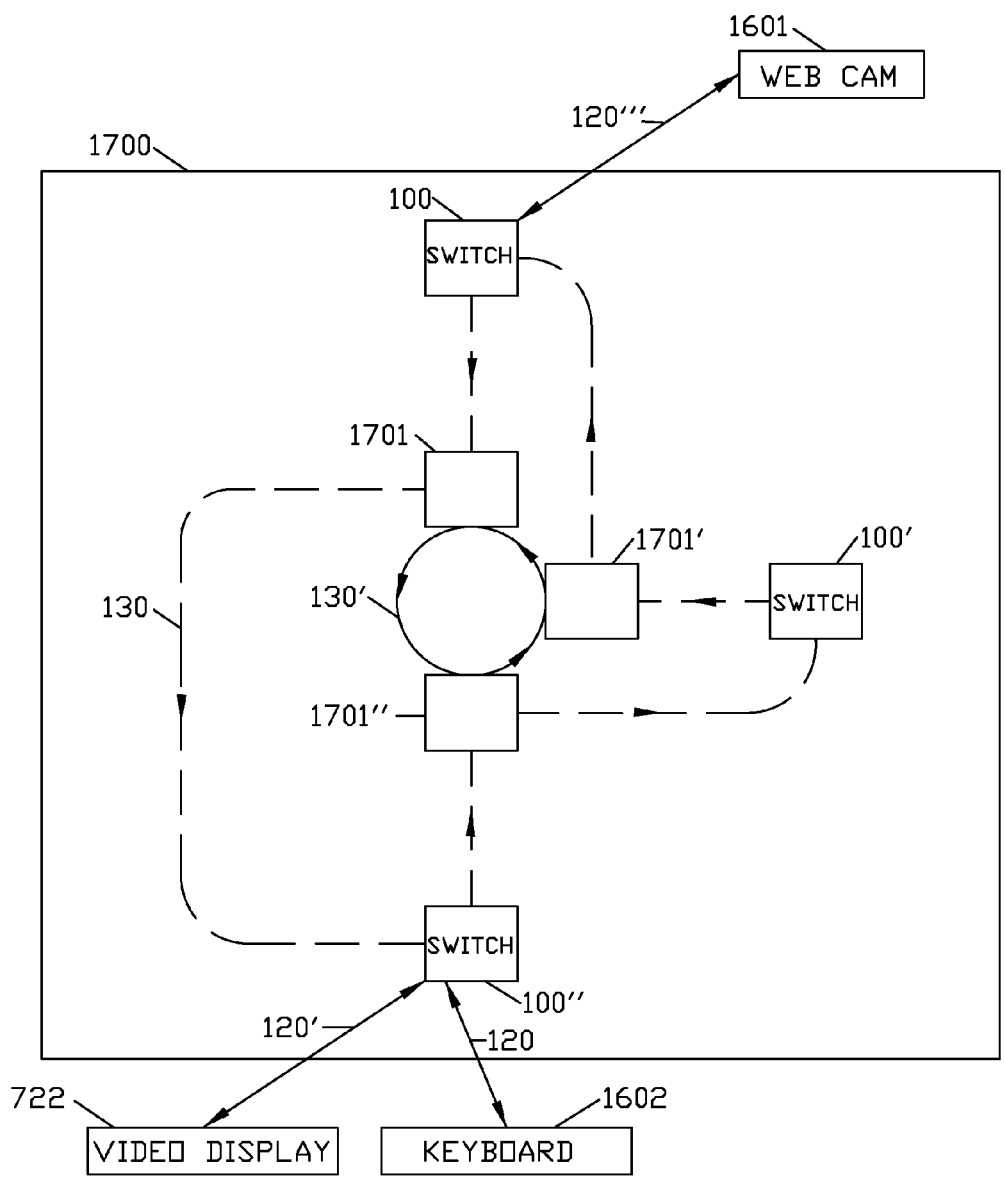
FIG. 17 illustrates an alternate architecture of the present invention configured as a distributed compute device.

Another example of distributed compute device architecture is illustrated in FIG. 17. In this embodiment of the present invention the functionality of the computer processor 1600 shown in FIG. 16 is replaced with a "DataSpace-within-a-DataSpace", or what will be referred to as global processor 1700. In this embodiment, the operating system (O/S) and file system are continuously transmitted on DataSpace 130, as shown with a dashed line, are encapsulated in continuously transmitted data packet(s) and/or data stream(s). The processor cache, ROM for processor software, and data storage are continuously transmitted on DataSpace 130.

DataSpace switches 100, 100', 100" are described in FIGS. 1 and 2. The video display 722 is connected to DataSpace 130 via data link 120', and is used to view output processed by the global processor 1700. The keyboard 1602 is connected to DataSpace 130 via data link 120, and is used to input commands into processors 1701, 1701', and 1701". A peripheral device, a web cam 1601, is shown connected to the DataSpace 130 via data link 120'".

The O/S and file system continuously transmitted on DataSpace 130 perform traditional task management procedures such as, but not limited to, task scheduling, file management, and resource and services management for the processors 1701, 1701', 1701" connected to DataSpace 130 and DataSpace 130'. In addition, DataSpace 130' reverberates data packet(s) and/or data stream(s) containing information such as, but not limited to, dynamic and static O/S configuration and operational information, semaphores, device drivers, users, system status, and instruction sets.

DataSpace 130' reverberates data packet(s) and/or data stream(s) containing information such as, but not limited to, processor cache, shared memory, and instruction sets, etc., for use by processors 1701, 1701', and 1701". (Delete One Of The Periods)

TRANSMETA-LIKE COMPUTE DEVICE—Transmeta Corporation manufactures the Crusoe processor, which is an x86-compatible chip specially designed for the handheld and lightweight mobile computing market. The Crusoe processor is a hardware-software hybrid chip that consumes significantly less power than standard processors by transferring the function of millions of transistors with their proprietary "code-morphing" software.

The Code Morphing software is designed to dynamically translate x86 instructions into VLIW (Very Long Instruction Word) instructions for the underlying Crusoe hardware engine. The Code Morphing software resides in flash ROM. The Code Morphing software consists of two main modules that work in conjunction to implement the functions of an x86 processor.

The Interpreter software contains a module that interprets x86 instructions one at a time, much like a traditional microprocessor. The Interpreter functionality also filters infrequently executed code from being needlessly optimized and gathers run time statistical information about the x86 instructions it sees for determining whether optimizations are necessary.

The Translator software detects critical, frequently used x86 instruction sequences. The Code Morphing software invokes a module that recompiles the x86 instructions into optimized VLIW instructions, called "Translations." The native translations reduce the number of instructions executed and results in better performance.

Further efficiencies are possible by saving the translations in memory that is inaccessible to normal x86 code. This special memory area is named the "Translation Cache" and allows the Code Morphing software to re-use translations and eliminate redundancies. Upon encountering previously translated x86 instruction sequences, the Code Morphing software skips the translation process and executes the cached translation directly out of the Translation Cache.

Caching and re-using translations exploits the high degree of repetition typically found in real world workloads. The Code Morphing software matches repeated executions with entries in the Translation Cache and the optimized translation is executed at full speed with minimal overhead. The initial cost of the translation is amortized over repeated executions.

A DataSpace 130, 130' as shown in FIGS. 16 and 17 can be adapted for use with Transmeta, or Transmeta-like processors to enhance compute functionality on a DataSpace 130, 130'. The DataSpace 130, 130' can function as the ROM normally used to store the Code Morphing software, including interpreter and translator modules, and also the translator cache. The DataSpace 130, 130' would encapsulate, and continuously transmit the Code Morphing software and translator cache in data packet(s) and/or data stream(s).

It is not the goal of the present invention to adapt a DataSpace for use with Transmeta, and Transmeta-like processors in order to increase the battery life of mobile devices, but to convert a DataSpace for use a compute device that is easily scalable. Another benefit of a DataSpace integrated with a Transmeta, or Transmeta-like processor would be to modify, upgrade and change Transmeta, or Transmeta-like processors' ROM based on the task the Transmeta processor is to perform.

Figure 18:
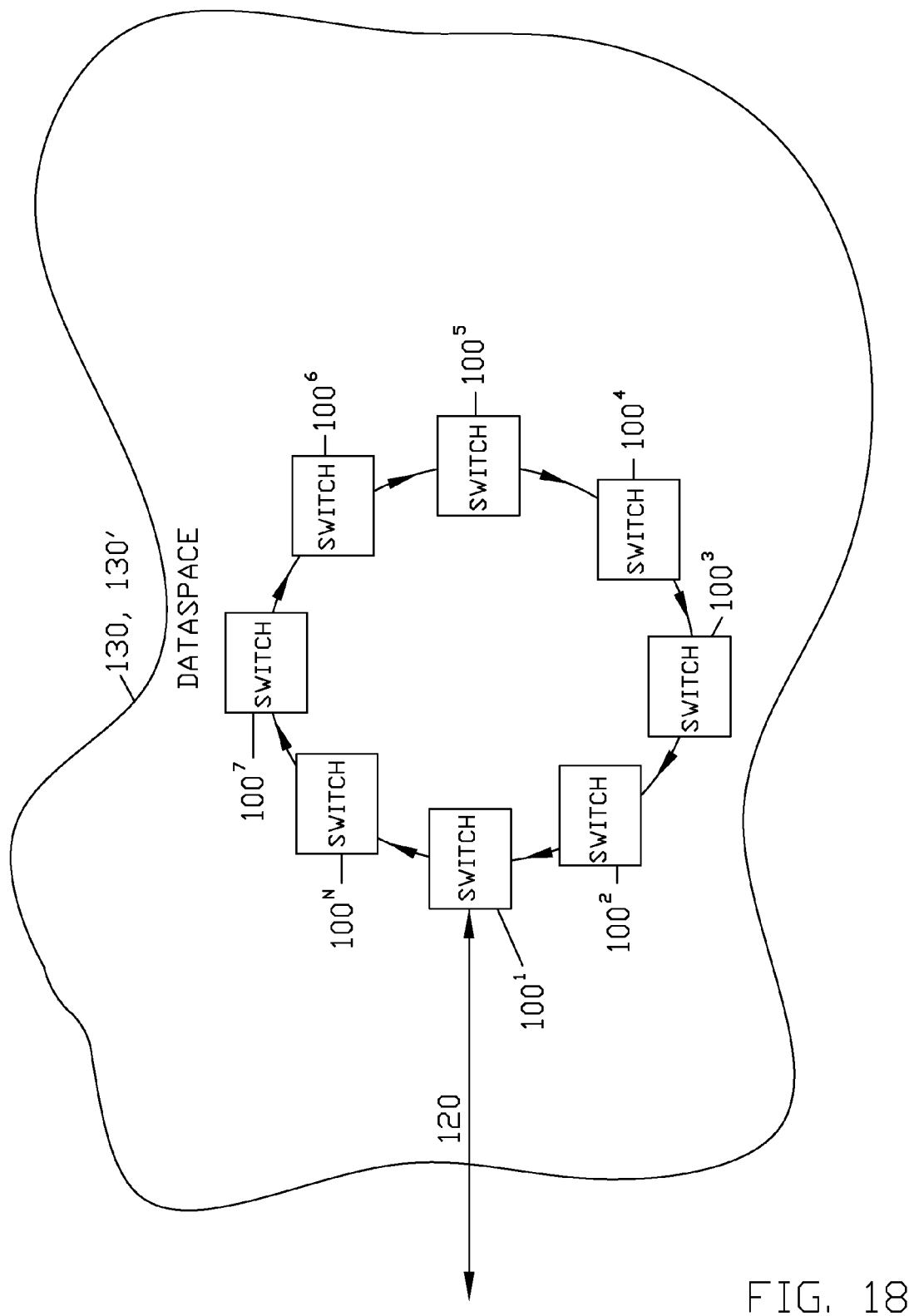
FIG. 18 illustrates the architecture of the present invention configured for math computations.

MATH COMPUTATION DEVICE—One example of a DataSpace configured for math computations, particularly numbers exceeding 64 bits in length, or highly re-iterative calculations, is illustrated in FIG. 18. Data link 120 is used to connect to the DataSpace 130, 130'. DataSpace switches 100$^N$, where "N" represents a "specific bit position value of a number", are configured to perform normal DataSpace switch 100$^N$ functions on continuously transmitted data packet(s) and/or data stream(s), such as copying, forwarding, reading, deleting, etc. In addition DataSpace switches 100$^N$ are programmed to perform addition and subtraction operations on the values represented in the "bit frames". Where "N" equals "1" in a bit frame, DataSpace switch 100$^1$ would only process bit position 1 within a bit frame and DataSpace switch 100$^{128}$ would only process bits contained within bit position "128", etc.

After the DataSpace switch 100$^N$ has added and subtracted bit values in two or more data packet(s) and/or data streams, it outputs a resultant data packet(s) and/or data stream(s) corresponding to bit position it is processing. It may output two data packet(s) and/or two data streams(s), and/or two values in a data stream if there is carryover from the math processing on the bit values. The carryover data packet(s) and/or data stream value(s) would be identified with a bit position of N+1. As an example, DataSpace switch 100$^{64}$, processing bit position 64, will output a resultant data packet, and/or data stream value identified as the resultant of operations performed on bits with a bit position value of 64. If there is carryover, DataSpace switch 100$^{64}$ will also output a data packet, and/or data stream value with a bit position value of 65, which is N+1.

Chart 8 illustrates an example of a bit frame designed to support math computations on a DataSpace(s).

CHART 8

| VARIABLE LENGTH DATASPACE BIT FRAME FOR MATH COMPUTATIONS | | | | | | |
|---|---|---|---|---|---|---|
| NUMBER ID | FRAME TYPE | INTEGER OR DECIMAL | BIT POSITION | BIT OPERATION | BIT SIGN | BIT VALUE |
| Variable | 1 octet | 1 octet | Variable >=1 octet | 1 octet | 1 octet | 1 octet |

The "Number ID" value is used to indicate which operand the bit value has come from. The "frame type" is used to indicate what iterative value this is of the bit value contained in the data packet, or if the bit value is a resultant, etc. The "Integer or Decimal" value indicates which counting convention to use to determine the correct "bit position" value. The "bit position" value indicates which position the "bit value" occupied in a text string number from right-to-left for an integer, or left-to-right for a decimal. The "bit operation" value indicates whether the bits are to be added or subtracted to the operand with a "Number ID" of the current data packet plus "1". The "bit sign" value indicates whether operands should be added or subtracted from one other. The "bit value" is the actual bit that is being processed.

In the architecture shown in FIG. 18, DataSpace switch 100' also functions as the head-end switch which delimits the incoming text string numbers, and encapsulates them in a bit frame, and reverberates them on the DataSpace 130, 130'. In addition, the DataSpace switch 100' is capable of acting as a gate-keeper in conjunction with other DataSpaces configured architecturally as "AND", "NOT", "OR", "NAND", "NOR", and "XOR" gates, etc., in order to perform any logical operation associated with a compute device.

Chart 9 illustrates a general flow for using a DataSpace adapted for math computations.

CHART 9

FLOW FOR DATASPACE ADAPTED FOR MATH COMPUTATIONS

1) DataSpace switch adapted for math computations receives numbers represented as a text strings.
2) A head-end DataSpace switch adapted for math computations delimits the text string number, encapsulates it, and identifies it by bit position and which specific operand the bit value is associated with.
3) Delimited data packet(s) and/or data stream(s) are continuously transmitted on a DataSpace 130, 130'.
4) The appropriate DataSpace switch for each bit position adds or subtracts the bit values represented in the data packet(s) and/or data stream(s) and encapsulates the resultant into data packet(s) and/or data stream(s) and identifies the bit position processed including any carry-over.
5) The DataSpace recirculates the resultant data packet(s) and/or data stream(s) until there are no carryover data packet(s) and/or data stream values.
6) A DataSpace switch at the head-end adapted for math computations receives the resultant data packet(s) and recirculates them, or forwards them to another DataSpace130, 130' if further processing is required, or returns them to the originator of the computation request.

In an alternative embodiment, a pair of DataSpace switches with "N" number of ports could be programmed such that the "bit positions" of a text string number were related to a port number on the DataSpace switches. In this embodiment, each port on a DataSpace switch would be connected to a separate processor.

The method described above is one example of performing computations on numbers stored/cached on a DataSpace, where long numbers could easily be represented as polynomials. In addition, matrices for use in matrix math can be created using data packet(s) and/or data stream(s) indexed to a switch port to represent rows, and columns created using indexed data packet(s) and/or data stream(s).

LIGHTWAVES DATA LINK ADAPTED FOR DATASPACE—DataSpace is the storage of elements such as data, video, audio, graphics, etc. on a telecommunication network. While the concept of a DataSpace is not transport or protocol specific, the following describes a DataSpace adapted for use with the Lightwaves Data Link (LDL) proprietary protocol. LDL was designed for use with the broadband transport system described in U.S. Provisional Patent, Ser. No. 60,376,592, to Melick, et al, entitled HIGH NUMBER BASE ENCODED ULTRA WIDEBAND OVER GUIDED LINES AND NON-GUIDED NARROW BAND RADIO which was previously incorporated by reference.

LDL is a proprietary protocol based on Simple Data Link (SDL), which is a variable length Asynchronous Transfer Mode (ATM) protocol.

This embodiment of the present invention includes two LDL data frame architectures for use with a DataSpace. The first architecture uses LDL to create a DataSpace of fixed length blocks that looks like a standard disk media device to protocols and subsystems such as iSCSI. The second architecture uses LDL to create a DataSpace of variable length blocks, and is oriented towards supporting applications such as the previously discussed chaotic databases.

FIXED BLOCK LENGTH LDL ADAPTED FOR DATASPACE—Chart 10 illustrates the basic structure of a fixed block length data frame:

CHART 10

DATASPACE LDL DATA FRAME FIXED BLOCK ARCHITECTURE

| LDL Header | LDL Private Area | LDL Payload | | LDL Check |
| --- | --- | --- | --- | --- |
| LDL Payload Data Length | Payload Length CRC | DataSpace Sector & Block ID | Block Data | Private & Payload CRC |
| 2 octets | 2 octets | 4 octets | <=65,535 octets | 4 octets |

Most traditional storage systems utilize fixed-length block sizes, for example, 256, 512, 1024 bytes. As a DataSpace is created the appropriate number of fixed length blocks will be created to be utilized by the connected operating system (OS) and/or file system.

In this embodiment of the present invention, the DataSpace is configured to contain a group of LDL fixed length frames representing data storage blocks, similar to what has been previously described in the first prototype as illustrated in FIGS. 7 through 11. The DataSpace switch receives block requests from an iSCSI client through an iSCSI interface, and in turn performs read and write actions on the Data space's LDL payloads representing the memory blocks.

FIG. 4 illustrates one architecture of a DataSpace that is suitable for the storage/caching of traditional element storage blocks. The client device requests a file or element that traverses through the operating system (OS) and/or file system, such as, but not limited to an iSCSI transport. The transmission over iSCSI send and receives "block read and write requests" to an iSCSI server device.

VARIABLE BLOCK LENGTH LDL ADAPTED FOR DATASPACE—The DataSpace LDL frame uses some of the same elements in SDL. The core DataSpace LDL data frame fields are outlined in Chart 11.

CHART 11

CORE VARIABLE DATASPACE LDL DATA FRAME

| LDL Header | | | | | LDL Payload | LDL Check |
| --- | --- | --- | --- | --- | --- | --- |
| LDL Payload | Payload | LDL Private Area | | | Payload | Private & |
| Data Length | Length CRC | LDL Private Length | DataSpace Version | DataSpace Frame ID | DataSpace Data Area | Payload CRC |
| 2 octets | 2 octets | 1 octet | 1 octet | 4 octets | <=65,535 octets | 4 octets |

By changing the version of the LDL data frame, a different private area can be created in both size and content. The underlying core LDL processing is capable of sending and receiving data frames of varying types. The ability to process the data frame is independent of the device's ability to end-process the frame by a higher layer application.

Chart 12 illustrates some possible data frame version values and descriptions.

CHART 12

DATASPACE LDL VERSION TABLE

| DataSpace LDL Version | Version Octet Value | Description | LDL Private Area Size |
|---|---|---|---|
| Core Variable Frame | 1 | Default DataSpace LDL frame. | 6 octets |
| DataSpace DOE | 12 | DataSpace Directory of Elements | 6 octets |
| DataSpace DES | 13 | DataSpace Element Storage | 6 octets |
| DataSpace DESE | 14 | DataSpace Element Storage Extended | 10 octets |
| DataSpace MDESE | 15 | DataSpace Element Meta | 10 octets |

A DataSpace is based upon the continuous reverberation of data frames, which could be implemented with or without a directory of elements (DOE) area, which is analogous to a file system allocation tables. The primary benefit to implementing a DOE within a DataSpace is to improve DataSpace efficiency The LDL Payload Data Area for a DataSpace DOE frame contains the index to other elements within the DataSpace. The DOE information for each element can be defined or enhanced by using an XML-based technology.

Chart 13 is an example of implementing a DataSpace DOE with pseudo-XML:

CHART 13

DATASPACE LDL DOE WITH PSEUDO-XML

```
<?xml version="1.0"?>
<dataspace version="1.0">
    <doe version="1.0">
        <element>
            <name>Element Name</name>
            <expiry>
            ...
            </expiry>
            <access>
                <owner>
                ...
                </owner>
                <digital rights>
                ...
                </digital rights>
            </access>
            <location dspace="X" ldlframe="Y" offset="Z"/>
        </element>
    </doe>
</dataspace>
```

When a DOE is implemented on a DataSpace, separate LDL frames will be created as required, for providing the DOE information to the DataSpace switches. Chart 14 illustrates the basic LDL DOE data frame structure.

CHART 14

DATASPACE LDL DOE DATA FRAME

| LDL Header | | | | | | LDL Check |
|---|---|---|---|---|---|---|
| | Payload | LDL Private Area | | | LDL Payload | Private & |
| LDL Payload Data Length | Length CRC | LDL Private Length | DataSpace Version | DataSpace Frame ID | DataSpace Data Area | Payload CRC |
| 2 octets | 2 octets | 1 octet | 1 octet | 4 octets | <=65,535 octets | 4 octets |
| Variable | Variable | 6 | 12 | Variable | Variable | Variable |

The LDL payload data area for a DataSpace DOE frame contains the index to other elements within the DataSpace. The DOE information for each element can be defined, for example, using an XML-based technology.

LDL frames can be allocated for storing/caching elements either registered or not registered under the DataSpace DOE. The LDL frame for DataSpace Element Storage (DES) can be allocated or de-allocated as required, by the DataSpace management system and can contain more than one element. Chart 15 illustrates the basic LDL DES data frame architecture.

CHART 15

| DATASPACE LDL DES DATA FRAME | | | | | | |
|---|---|---|---|---|---|---|
| LDL Header | | | | | | LDL Check |
| LDL | Payload | LDL Private Area | | | LDL Payload | Private & |
| Payload Data Length | Length CRC | LDL Private Length | DataSpace Version | DataSpace Frame ID | DataSpace Data Area | Payload CRC |
| 2 octets | 2 octets | 1 octet | 1 octet | 4 octets | <=65,535 octets | 4 octets |
| Variable | Variable | 6 | 13 | Variable | Variable | Variable |

Chart 16 is an illustration of the layout DataSpace LDL DES data frame.

CHART 16

| DATASPACE LDL DES EXTENDED DATA FRAME | | | | | | | |
|---|---|---|---|---|---|---|---|
| LDL Header | | | | | | LDL Payload | LDL Check |
| LDL | | LDL Private Area | | | | | |
| Payload Data Length | Payload Length CRC | LDL Private Length | DataSpace Version | DataSpace Frame ID | Next DataSpace Frame ID | DataSpace Data Area | Private & Payload CRC |
| 2 octets | 2 octets | 1 octet | 1 octet | 4 octets | 4 octets | <=65,535 octets | 4 octets |
| Variable | Variable | 10 | 14 | Variable | Zero or Variable | Variable | Variable |

Chart 17 is an illustration of the layout of a DataSpace LDL DES extended data frame.

CHART 17

| DATASPACE LDL DES EXTENDED DATA FRAME (META) | | | | | | | |
|---|---|---|---|---|---|---|---|
| LDL Header | | | | | | | LDL Check |
| LDL | | LDL Private Area | | | | | |
| Payload Data Length | Payload Length CRC | LDL Private Length | DataSpace Version | DataSpace Frame ID | Next DataSpace Frame ID | LDL Payload DataSpace Data Area | Private & Payload CRC |
| 2 octets | 2 octets | 1 octet | 1 octet | 4 octets | 4 octets | <=65,535 octets | 4 octets |
| Variable | Variable | 10 | 15 | Variable | Zero or Variable | Variable | Variable |

The LDL DataSpace payload area contains the data to be stored on the DataSpace. These data elements may or may not be registered with the DataSpace DOE. They are not limited to one DES data frame and could span multiple data frames.

When a new element is added to a DataSpace, the DataSpace switch inserts the data element(s) into the DataSpace creating a new frame(s). In an effort to reduce the complexity of free space management, new data frames are allocated for new data elements as they are entered in the DataSpace.

The DataSpace will inspect the DataSpace DES and DOE areas for data that has expired, or marked for deletion. These data packets will simply be removed from the DataSpace.

Using LDL as a DataSpace protocol eliminates the need to manipulate the data payloads typically required by other protocols. Other protocols require this manipulation to remove any data segments within the data payloads that are identical to the ones used by the protocol for segregating the separate data payloads. As an example, if a DataSpace is implemented in a protocol such as Ethernet, a combination of characters, such as Ethernet's 7 octet sized preamble, would be used as a marker/indicator in between multiple PDUs as a means to delineate the multiple PDUs. In this example, insertion of an element into the DataSpace DES would require substituting modified sequences that differ from the PDU delineation sequence, with sequences identical to those used by the DataSpace element delineation. In addition, when data is removed from the DataSpace DES payload for inspection or delivery, the payload would have to be inspected again and any substituted sequences removed and the original sequences reconstructed. Using the LDL protocol removes the requirement for manipulating the DES payloads on insertion and/or reading.

In cases where payloads to be stored are greater than one frame, a linkage is maintained between the frames so that the entire payload can be extracted. The LDL DES extended frame contains a field named "Next LDL Frame ID.", which is the next sequential 64K octets of the data element stored/cached on a DataSpace. This is an iterative process until no more frames are required for storing the entire data element. When the last frame containing the element is reached, its "Next LDL Frame ID" field is set to a value of zero.

For some data elements, it is useful to add an additional meta-information frame that describes the nature of the data element contained in the next frame(s). Examples of this type of information are source origination, method of delivery, etc.

When an element is inserted into a DataSpace, a separate meta-data frame can be constructed and linked to the next series of frame(s) containing the actual data element. If the data element is managed by the DataSpace DOE, a meta-data frame will be the first frame in the data element stream of frames.

The fields and block sizes described in Charts 10 through 17 are examples, and may be changed, deleted, modified, or eliminated, as required during implementation.

While the DataSpace has been illustrated and prototyped in a form that would indicate its architecture is static, a DataSpace's configuration can also be dynamic in nature for any period of time including the lifespan of a DataSpace. DataSpace components including but not limited to DataSpace switches, intelligent controllers, clients, network transport mediums, processors, etc., can be inserted, removed and re-configured as required. Examples of a when DataSpace re-configuration may be required are when DataSpace component(s) fail, DataSpace components are added or removed for performance, reliability and scalability reasons, adding new functionality or processing capabilities, new applications, and for general operation, management and maintenance functionality.

While the present invention has been described by way of example, in terms of two prototype systems, and in terms of the specific embodiments, it is to be understood that the present invention is not limited to the disclosed embodiments. It is intended to cover various modifications and similar arrangements, methodologies, and related devices, and systems as would be apparent to those skilled in the art. Those skilled in the art to which the present invention pertains will recognize and be able to practice additional variations in the methods and systems described which fall within the teachings of this invention.

Accordingly, all such modifications and additions are deemed to be within the scope of the invention.

What is claimed is:

1. A system for persistently maintaining data using a network for data packets, comprising:
    a transmission medium associated with the network;
    a plurality of switches operatively connected to the transmission medium, each switch having an intelligent network controller for delivering the data packets to a device operatively connected to the intelligent network controller in response to a request for the data packets from the device and for determining if the data packets are unexpired based on an expiration property of the data packets and re-transmitting unexpired data packets over the network;
    wherein the intelligent network controller of each of the plurality of switches being configured to route block input/output (I/O) operation requests from the device to the data packets on the network;
    wherein the expiration property of the data packets specifies an amount of time the data packets are persistently maintained on the network sufficient to allow the data packets to be stored, accessed, and searched while reverberating on the system.

2. The method of persistently maintaining data from a network of claim 1 wherein the transmission occurs using radio frequency over guided media.

3. The method of persistently maintaining data from a network of claim 1 wherein the transmission occurs using radio frequency system over non-guided media.

4. The method of persistently maintaining data from a network of claim 1 wherein the transmission occurs using an ultra wideband radio frequency system over guided media.

5. The method of persistently maintaining data from a network of claim 1 wherein the transmission occurs using an ultra wideband radio frequency system over non-guided media.

6. The method of persistently maintaining data from a network of claim 1 wherein the transmission occurs using fiber optic media.

7. A system for persistently maintaining data using a network for data streams, comprising:
    a transmission medium associated with the network;
    a plurality of switches operatively connected to the transmission medium, each switch having an intelligent network controller for delivering at least one of the data streams to a device operatively connected to the intelligent network controller in response to a request for the at least one of the data streams from the device and for determining if the data streams are unexpired based on an expiration property of the data streams and re-transmitting unexpired data streams over the network;
    wherein each of the plurality of switches being configured to buffer the data packets for a time period longer than time of transit between switches;
    wherein the expiration property of the data stream is specified by a XML tag and specifies an amount of time the data streams are persistently maintained on the network sufficient to allow the data stream to be stored, accessed, and searched while reverberating on the system; and
    wherein the intelligent network controller of each of the plurality of switches being configured to route block input/output (I/O) operation requests from the device to the data streams on the network.

8. The method of persistently maintaining data from a network of claim 7 wherein the transmission occurs using radio frequency over guided media.

9. The method of persistently maintaining data from a network of claim 7 wherein the transmission occurs using radio frequency system over non-guided media.

10. The method of persistently maintaining data from a network of claim 7 wherein the transmission occurs using an ultra wideband radio frequency system over guided. media.

11. The method of persistently maintaining data from a network of claim 7 wherein the transmission occurs using an ultra wideband radio frequency system over non-guided media.

12. The method of persistently maintaining data from a network of claim 7 wherein the transmission occurs using fiber optic media.

13. A method of storing data such that data is available to multiple users without requiring a fixed storage medium comprising:
associating an expiration property with data, the expiration property defining a time period for which the data is stored on a network;
sending the data and expiration property over the network;
receiving the data and expiration property by at least one device associated with the network which uses the data;
storing the data in a random access memory of the at least one device for a time period longer than a transit time between the sending of the data and the receiving of the data;
accessing the data in a block input/output (I/O) operation request determining if the data is not expired based on the expiration property;
if the data is not expired, re-transmitting the data and expiration property by the at least one device associated with the network to persistently maintain the data on the network for the time period; and
wherein the expiration property is specified by a XML tag and specifies an amount of time the data streams are persistently maintained on the network sufficient to allow the data stream to be stored, accessed, and searched while reverberating on the system.

14. The method of claim 13 wherein the network is a telecommunications network.

15. The method of claim 13 wherein the data includes a data portion and a meta data portion.

16. The method of claim 13 further comprising importing the data from the at least one device into an application for data access.

17. A system for persistently maintaining data using a circuit, comprising:
a transmission medium associated with the circuit; and
a plurality of switches operatively connected to the transmission medium, each switch having an intelligent controller for delivering the data to a device operatively connected to the intelligent controller in response to a block input/output (I/O) request for the data from the device and for determining if the data is unexpired based on an expiration property associated with data and re-transmitting unexpired data over the circuit;
wherein each of the plurality of switches being configured to buffer the data for a time period longer than time of transit between switches; and
wherein the expiration property is specified by a XML tag and is sufficiently long to allow the data to be stored, accessed, and searched while reverberating on the system.

18. The system of claim 17 wherein the data is packet data.
19. The system of claim 17 wherein the data is stream data.
20. The system of claim 17 wherein the circuit includes at least a portion of a microprocessor.

21. A system for persistently maintaining data using a network for data packets, comprising:
a transmission medium associated with the network;
a plurality of switches operatively connected to the transmission medium, each switch having an intelligent network controller for delivering the data packets to a device operatively connected to the intelligent network controller in response to a block input/output request for the data packets from the device and for determining if the data packets are unexpired based on an expiration property of the data packets and re-transmitting unexpired data packets over the network;
wherein each of the plurality of switches comprises a memory with a processing buffer for sending of the unexpired data packets and subsequent receiving and re-transmitting of the unexpired data packets to thereby provide for persistently maintaining the data;
wherein each of the plurality of switches being configured to buffer the data for a time period longer than time of transit between switches; and
wherein the expiration property is specified by a XML tag and specifics an amount of time the data packets are persistently maintained on the network sufficient to allow the data packets to be stored, accessed, and searched while reverberating on the system.

22. The system of claim 21 wherein the expiration property includes a geographical constraint.

23. The system of claim 21 wherein the network is in operative communication with at least one additional network and wherein the intelligent network controller retransmits the unexpired data packets over the at least one additional network.

24. The system of claim 23 wherein the intelligent controller uses geographical information to choose at least one of the at least one additional network.

25. A system for persistently maintaining data using at least one network for data packets, comprising:
a transmission medium associated with the at least one network;
a plurality of switches operatively connected to the transmission medium, each switch having an intelligent network controller for delivering the data packets to a device operatively connected to the intelligent network controller in response to a block input/output request for the data packets from the device and for determining if the data packets on the at least one network are unexpired based on an expiration property of the data packets and re-transmitting unexpired data packets over at least one of the at least one network;
wherein each of the plurality of switches being configured to buffer the data packets for a time period longer than time of transit between switches; and
wherein the expiration property is specified by a XML tag and specifies an amount of time the data packets are persistently maintained on the network sufficient to allow the data packets to be stored, accessed, and searched while reverberating on the system.

26. The system of claim 25 wherein the intelligent network controller uses geographical information to choose the at least one of the at least one network in response to a request for the data packets.

27. A method of storing data such that data is available to multiple users without requiring a fixed storage medium comprising:
associating an expiration property with data;
sending the data and expiration property over at least one network;
receiving the data and expiration property by at least one device associated with the at least one network in response to a block input/output request for the data and wherein the at least one device uses the data;
determining if the data is not expired based on the expiration property;
if the data is not expired, re-transmitting the data and the expiration property by the at least one device associated with the at least one network to persistently maintain the data on the at least one network thereby storing the data on the at least one network;

wherein each of the plurality of switches being configured to buffer the data for a time period longer than time of transit between switches; and wherein the expiration property is specified by a XML tag and specifies an amount of time the data packets are persistently maintained on the network sufficient to allow the data packets to be stored, accessed, and searched while reverberating on the system.

28. The method of claim 27 wherein the re-transmitting the data and the expiration property being selectively performed over the at least one network based on a geographical constraint associated with the expiration property.

29. A system for persistently maintaining data using a network for data streams, comprising:

a transmission medium associated with at least one network;

a plurality of switches operatively connected to the transmission medium, each switch having an intelligent network controller for delivering at least one of the data streams to a device operatively connected to the intelligent network controller in response to a request for the at least one of the data streams from the device and for determining if the data streams are unexpired based on an expiration property of the data streams and re-transmitting unexpired data streams over at least one of the at least one network;

wherein each of the plurality of switches being configured to buffer the data streams for a time period longer than time of transit between switches;

wherein at least one of the unexpired data streams is a DVD movie or series of movies and wherein the expiration property is specified by a XML tag to be sufficiently long to allow the entire unexpired data streams to be stored on the system.

30. The system of claim 29 wherein the intelligent network controller uses geographical information to choose the at least one of the at least one network in response to a request for the data packets.

* * * * *